US008938431B2

(12) United States Patent
Densham et al.

(10) Patent No.: US 8,938,431 B2
(45) Date of Patent: *Jan. 20, 2015

(54) SYSTEM AND METHOD FOR REAL-TIME ENVIRONMENT TRACKING AND COORDINATION

(71) Applicant: CAST Group of Companies Inc., Toronto (CA)

(72) Inventors: Gilray Densham, Inglewood (CA); Justin Eichel, Waterloo (CA)

(73) Assignee: CAST Group of Companies Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,919

(22) Filed: Jan. 6, 2014

(65) Prior Publication Data

US 2014/0119606 A1   May 1, 2014

Related U.S. Application Data

(63) Continuation of application No. 12/421,343, filed on Apr. 9, 2009, now Pat. No. 8,639,666.

(60) Provisional application No. 61/094,613, filed on Sep. 5, 2008.

(51) Int. Cl.
*G06F 17/30* (2006.01)
*G06K 9/00* (2006.01)
(Continued)

(52) U.S. Cl.
CPC ............ *G06K 9/00624* (2013.01); *G05B 17/02* (2013.01); *H05B 37/029* (2013.01)
USPC ........... 707/687; 345/419; 345/427; 345/474; 345/619; 345/653

(58) Field of Classification Search
USPC .......... 707/687, 741; 345/419, 653, 958, 427, 345/474, 420, 159, 619; 715/863, 771
See application file for complete search history.

(56) References Cited

U.S. PATENT DOCUMENTS 5,577,981 A * 11/1996 Jarvik ................................ 482/4
6,014,628 A    1/2000 Kovarik, Jr. et al.
(Continued)

FOREIGN PATENT DOCUMENTS

WO     2006059151 A1   6/2006

OTHER PUBLICATIONS

Mallem et al.; "A Multimedia Control Interface in Teleoperation"; Proceedings of the International Conference on Systems Engineering in the Service of Humans, "Systems, Man and Cybernetics"; Oct. 17 to 20, 1993; pp. 126 to 131; vol. 3.
(Continued)

*Primary Examiner* — Jean M Corrielus
(74) *Attorney, Agent, or Firm* — Blake, Cassels & Graydon LLP; Wilfred P. So

(57) ABSTRACT

A configurable real-time environment tracking and command module (RTM) is provided to coordinate one or more than one devices or objects in a physical environment. A virtual environment is created to correlate with various objects and attributes within the physical environment. The RTM is able to receive data about attributes of physical objects and accordingly update the attributes of correlated virtual objects in the virtual environment. The RTM is also able to provide data extracted from the virtual environment to one or more than devices, such as robotic cameras, in real-time. An interface to the RTM allows multiple devices to interact with the RTM, thereby coordinating the devices.

20 Claims, 15 Drawing Sheets

(51) Int. Cl.
*G05B 17/02* (2006.01)
*H05B 37/02* (2006.01)

(56) References Cited

U.S. PATENT DOCUMENTS

| | | | |
|---|---|---|---|
| 6,118,230 A | 9/2000 | Fleischmann | |
| 6,151,028 A * | 11/2000 | Kumagai et al. | 345/427 |
| 6,219,045 B1 | 4/2001 | Leahy et al. | |
| 6,282,455 B1 | 8/2001 | Engdahl | |
| 6,353,850 B1 | 3/2002 | Wies et al. | |
| 6,400,362 B1 * | 6/2002 | Uchiyama et al. | 345/420 |
| 6,563,520 B1 | 5/2003 | Parker et al. | |
| 6,774,885 B1 | 8/2004 | Even-Zohar | |
| 6,778,171 B1 * | 8/2004 | Kikinis | 345/419 |
| 7,043,695 B2 * | 5/2006 | Elber et al. | 715/771 |
| 7,084,869 B2 * | 8/2006 | Sriram et al. | 345/419 |
| 7,099,745 B2 | 8/2006 | Ebert | |
| 7,181,690 B1 | 2/2007 | Leahy et al. | |
| 7,191,191 B2 * | 3/2007 | Peurach et al. | 1/1 |
| 7,202,613 B2 | 4/2007 | Morgan et al. | |
| 7,259,693 B2 | 8/2007 | Miller et al. | |
| 7,373,377 B2 | 5/2008 | Altieri | |
| 7,493,558 B2 | 2/2009 | Leahy et al. | |
| 7,626,569 B2 | 12/2009 | Lanier | |
| 7,630,986 B1 | 12/2009 | Herz et al. | |
| 7,646,394 B1 | 1/2010 | Neely et al. | |
| 7,756,902 B2 | 7/2010 | Lin | |
| 7,761,803 B2 | 7/2010 | Parker et al. | |
| 7,774,885 B2 | 8/2010 | Kressner et al. | |
| 7,868,610 B2 | 1/2011 | Velinsky et al. | |
| 7,945,856 B2 | 5/2011 | Leahy et al. | |
| 7,949,428 B2 | 5/2011 | Endo et al. | |
| 8,009,022 B2 | 8/2011 | Kipman et al. | |
| 8,082,501 B2 | 12/2011 | Leahy et al. | |
| 2003/0112281 A1 * | 6/2003 | Sriram et al. | 345/958 |
| 2004/0034683 A1 * | 2/2004 | Zhao | 709/201 |
| 2005/0108180 A1 | 5/2005 | Iwane | |
| 2006/0028476 A1 * | 2/2006 | Sobel | 345/474 |
| 2006/0241793 A1 | 10/2006 | Skourup et al. | |
| 2007/0239373 A1 | 10/2007 | Nasle | |
| 2011/0173204 A1 * | 7/2011 | Murillo et al. | 707/741 |
| 2012/0050535 A1 * | 3/2012 | Densham et al. | 348/159 |
| 2013/0063560 A1 | 3/2013 | Roberts et al. | |
| 2013/0128054 A1 * | 5/2013 | Densham et al. | 348/169 |
| 2013/0257899 A1 | 10/2013 | Baron et al. | |
| 2013/0307934 A1 * | 11/2013 | Densham et al. | 348/46 |

OTHER PUBLICATIONS

Ling, D.T.; "Virtual Worlds and Teleoperations"; Proceedings of the Fifth International Conference on Advance Robotics, "Robotics in Unstructure Environments"; 91 ICAR; Jun. 19 to 22, 1991; pp. 174 to 179; vol. 1.

Hewer et al.; "Telegrip: A Virtual Tool for Real World Control Problems"; IEEE Colloquium on Information Technology for Climbing and Walking Robots (Digest No. 1996/167); Oct. 29, 1996; pp. 6/1 to 6/5; Portsmouth, U.K.

Savin, Daniela; International Search Report from corresponding PCT Application No. PCT/CA2009/001225; search completed Dec. 14, 2009, received by applicant Jan. 14, 2010.

* cited by examiner

SYSTEM AND METHOD FOR REAL-TIME ENVIRONMENT TRACKING AND COORDINATION

This application is a Continuation of U.S. application Ser. No. 12/421,343 filed on Apr. 9, 2009 which claims priority from U.S. Application No. 61/094,613 filed Sep. 5, 2008, the contents of which are incorporated herein by reference.

TECHNICAL FIELD

The following relates generally to the coordination of one or more devices in a physical environment.

DESCRIPTION OF THE RELATED ART

When multiple devices function in a shared physical environment, the devices may be coordinated to function together. These devices may be coordinated to produce certain events based on a predetermined order or based on other preceding events.

Coordinating multiple devices may become difficult when events or actions are not easy to predict. In physical environments such as an entertainment stage, sporting arena, medical room, or military training course, there may be a number of unpredictable events and it may be desired that the devices are coordinated to react to the unpredictable events in a timely manner. For example, in a physical environment such as an entertainment stage there may be devices such as audio-visual equipment, lighting, cameras, and smoke-effect machines. In the entertainment stage environment, a person may walk across the stage and the lighting and camera may be coordinated to follow the person's position. The coordination of multiple devices becomes more complex as the number and variety of devices and events or actions also increase. It can be appreciated that the types of devices may vary depending on the physical environment in which a device is operating.

SUMMARY

A method is provided for coordinating a physical object in a physical environment which comprises creating in a computing device a virtual object corresponding to the physical object and mapping one or more attributes about the physical object onto the virtual object. A common interface is also provided between a client and the computing device, wherein the client and the computing device have a same file format. The computing device receives data pertaining to one or more of the attributes about the physical object from the client. The computing device also updates the one or more attributes about the virtual object using the data. The computing device then determines if updates to the one or more attributes about the virtual object meet one or more predetermined conditions. If the predetermined conditions are met, then a response is generated for the physical environment and the computing device provides the response to one or more clients in the physical environment.

The computing device comprises a processor that is configured to perform computer executable instructions relating to the method. The processor retrieves and stores data in a memory, also within the computing device. The data may comprise attributes about the physical object or virtual object. The common interface in the computing device is used to interconnect with the client.

BRIEF DESCRIPTION OF THE DRAWINGS

Embodiments will now be described by way of example only with reference to the appended drawings wherein.

DETAILED DESCRIPTION

Figure 1:
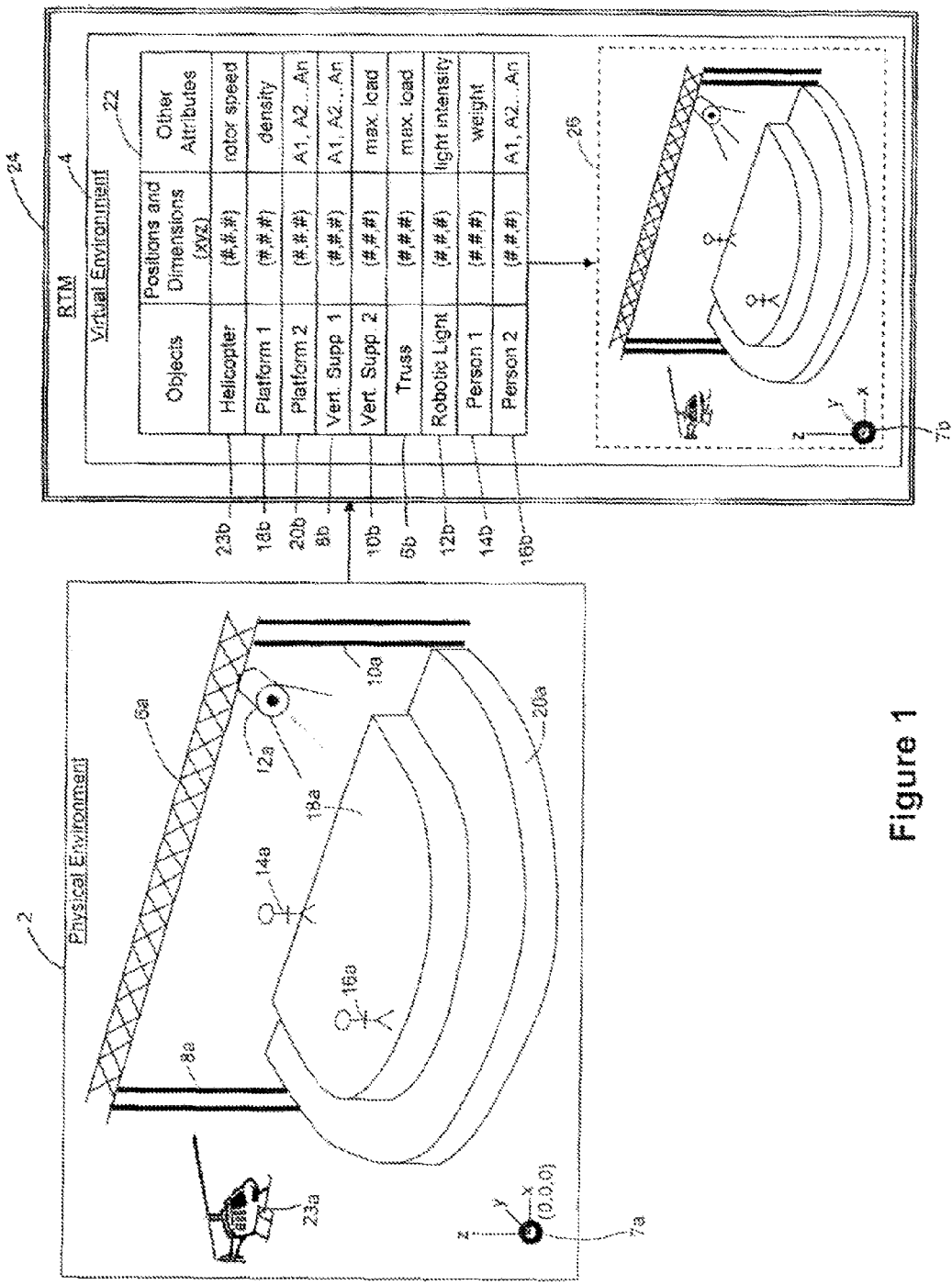
FIG. 1 is a system diagram illustrating one example of the generation of a virtual environment from a physical environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Many coordination systems or control systems are able to coordinate multiple devices using partially automated methods that rely on predefined cues or instructions. These predefined cues or instructions may be based on time, wherein a device, such as a light, is given a cue to illuminate a stage at a predetermined time. These predefined cues or instructions may be processed to output corresponding signals to control the direction in which a robotic light faces. In many physical environments with some degree of unpredictability, for example a live theatrical production, manually operated follow spotlights are used to track moving objects in the scenery. This may pose some difficulties when the object to be illuminated has a high degree of variability or unpredictability in movement, or if the original position of the object is not visually known, as is the case in a dark environment.

A configurable real-time environment tracking and command module (RTM), which can relay information about a physical environment to various connected devices, may be used to coordinate the devices operating within the physical environment. Information about a physical environment includes the movement of objects in six degrees of freedom (e.g. up/down; forward/backward; left/right; roll; pitch; and yaw). Other types of information are described below. It can be appreciated that the RTM may comprise any computing device or server able to execute computer readable instructions and able to access memory storage devices. Real-time herein refers to both hard real-time systems (e.g. completion of an operation after its deadline is not tolerated) and soft real-time systems (e.g. completion of an operation after its deadline is tolerated). The devices, e.g. physical devices, connected to the RTM, may be referred to herein as clients. It can be appreciated that the types of clients may vary and can depend on the physical environment in which it is operating. For example, clients in a manufacturing environment for metal products may include a robotic welding console, a conveyor belt, and a camera. In another example, clients in a military training environment may include a local positioning system to track a solider, a robotic gun, and a wirelessly controlled helicopter drone for surveillance. In an example of a medical application, the physical environment may be a human body and the clients connected to the RTM may include an electrocardiogram, a laparoscopic camera, an intravenous control system, a breathing apparatus, a display screen, and a robotic arm for surgery. It will therefore be appreciated that a client can be any type of device that can be configured to exchange computer executable instructions or data with the RTM and is applicable to the principles herein. This allows the RTM, a computing device, to interact with various clients and client types.

To coordinate the clients, the RTM provides information allowing one client to interact with another client. The RTM has a common interface that facilitates communication with clients. In other words, the RTM's common interface can transmit or receive data, or both, from various physical devices or clients. Examples of interfaces for communicating with clients include universal serial bus (USB), FireWire™, serial port interfaces, Bluetooth™, and other cabled and wireless communication mediums. It can be appreciated that any communication interface suitable for a computing device may be suitable. In one embodiment, the data or information exchanged between the RTM and the clients is considered live, or real-time, allowing the clients to synchronize their actions.

In an example of a theatrical production environment, positional data regarding a person (e.g. actor) is transmitted live from one or more position tracking clients to the RTM. The RTM may then combine or interpret the positional data before providing the data to a control console that controls several robotic lights. The control console uses the positional data to synchronize the facing direction of each robotic light in order to illuminate the actor.

It can be difficult to coordinate multiple objects, in a physical environment without a common positional reference or without awareness of the relative positions of objects. For example, steering a wirelessly controlled car while trying to avoid collision is difficult if it is not known where the walls or the vehicles are located. Therefore, understanding the physical environment and relationships, such as spatial relationships, between objects should be considered in order to coordinate these objects.

Turning to FIG. 1, a system diagram shows objects in a physical environment 2, in this case a stage, mapping onto a virtual environment 4. It can be appreciated that the virtual environment 4 resides within a computing environment, for example, having various processors, memory, interfaces, computer readable media, etc. Moreover, the virtual environment 4 can also be part of the RTM 24. A memory storage or database 22 of virtual objects and attributes is provided to correspond with the physical objects in the physical environment 2. For clarity, references to physical objects include the suffix 'a' and references to virtual objects include the suffix 'b'. The physical environment 2 in FIG. 1 comprises a first platform 18a supported below by a second platform 20a. An overhead truss 6a extends across the platforms 18a, 20a and is supported at its ends by two vertical supports 8a, 10a. A robotic light 12a is supported on the truss 6a for illuminating the first platform 18a, whereupon a first person 14a and a second person 16a are positioned. A wirelessly controlled helicopter drone 23a is flying above the platforms 18a, 20a. A three-dimensional origin or physical reference point 7a is positioned in front of the platforms 18a, 20a, whereby the positions of the physical objects are measured relative to the physical reference point 7a.

Each of these physical objects in the physical environment 2 are mapped onto the virtual environment 22, such that the virtual environment database 22 organizes the corresponding virtual objects and any corresponding attributes. The physical reference point 7a is mapped into the virtual environment 22, thus forming a virtual origin or reference point 7b. The positions of the virtual objects are mapped relative to the virtual reference point 7b. In this example, the virtual objects comprise a virtual helicopter 23b, a first virtual platform 18b, a second virtual platform 20b, a first vertical support 8b, a second vertical support 10b, a virtual truss 6b, a virtual robotic light 12b, a first virtual person 14b, and a second virtual person 16b. Physical attributes corresponding to each physical object are also represented as virtual attributes corresponding to each virtual object, wherein attributes typically include the position and dimensions of the objects as well as any data related to movement of the objects as well as any data related to movement of the objects (e.g. speed). In one embodiment, the position may be represented in Cartesian coordinates, such as the X, Y and Z coordinates. Other attributes that may also be used to characterize a virtual object include the rotor speed for the helicopter 23a, the maximum loads on the truss 6a, and the weight of a person 14b.

It can be appreciated that accurately depicting the virtual environment 4 to correspond to the physical environment 2 can provide a better understanding of the physical environment, thereby assisting the coordination of the clients within the physical environment. The process of depicting attributes of a physical object onto a corresponding virtual object can be considered a physical-to-virtual mapping. Accurately depicting the virtual environment 4 may comprise generating virtual objects based on data automatically provided by clients connected to the RTM 24. Alternatively, some of the virtual objects and their corresponding attributes may be manually entered into the virtual environment database 22. For example, an operator or technician of the RTM 24 may gather the dimensions of a truss and determine its center of mass and volumetric center. The operator may then create a virtual object with the same dimensions, center of mass and volumetric center that corresponds to the truss. The physical location of the truss, with respect to the physical reference point 7a, is also used to characterize the location of the virtual object. Thus, the virtual object corresponds very closely to the truss in the physical environment.

Other methods of generating a virtual environment 4 that accurately represents a physical environment include the use of three-dimensional computer drawings, floor plans and photographs. Three-dimensional computer drawings or CAD drawings, including .dwg and .dxf file formats, can be uploaded into the RTM's virtual environment 22. The computer drawings of the virtual objects can be scaled to match the dimensions of the physical objects; this mapping process may advantageously reduce the time to generate a virtual environment 4. Additionally, floor plans may be used to generate virtual objects. For example, a floor plan of a house showing the location of the walls may be scanned into digital form in the computer. Then, the walls in the virtual environment are given a height that corresponds to the height of the physical walls. Photographs may also be used to create a virtual environment as photographs typically illustrate relative dimensions and positions of objects in the physical environment regardless of the scale. An operator may use the photograph to generate a three-dimensional computer drawing or generate a virtual object directly by specifying the dimensions of the object. Photographs may also be used to generate a three-dimensional model using semi or fully automated 3D reconstruction algorithms by measuring the shading from a single photograph, or from a set of point correspondences from multiple photographs.

It can also be appreciated that the location of the physical reference point 7a can be positioned in any location. Preferably, the location of the physical reference point 7a is selected in a fixed, open area that facilitates consistent and clear measurement of the locations of physical objects relative to the physical reference point 7a. As can be seen from FIG. 1, the physical reference point 7a is located at the coordinates (0,0, 0) in the physical environment. Similarly, the virtual reference point 7b is mapped in the same position as the physical reference point 7a and is located at the coordinates (0,0,0) in the virtual environment. It can be appreciated that accurate correlation between the reference points 7a, 7b can be used to calibrate and verify the correspondence between the physical and virtual environments.

Continuing with FIG. 1, a visualization engine 26 uses the information stored in the virtual environment database 22 to generate a graphic, thereby illustrating or visualizing the physical environment 2 to permit interaction with a user. In other words, the visualization engine 26 provides a graphic of the virtual environment 4, which in turn substantially corresponds to the physical environment 2. In the configuration according to FIG. 1, the visualization engine 26 is part of the virtual environment 24.

Figure 2:
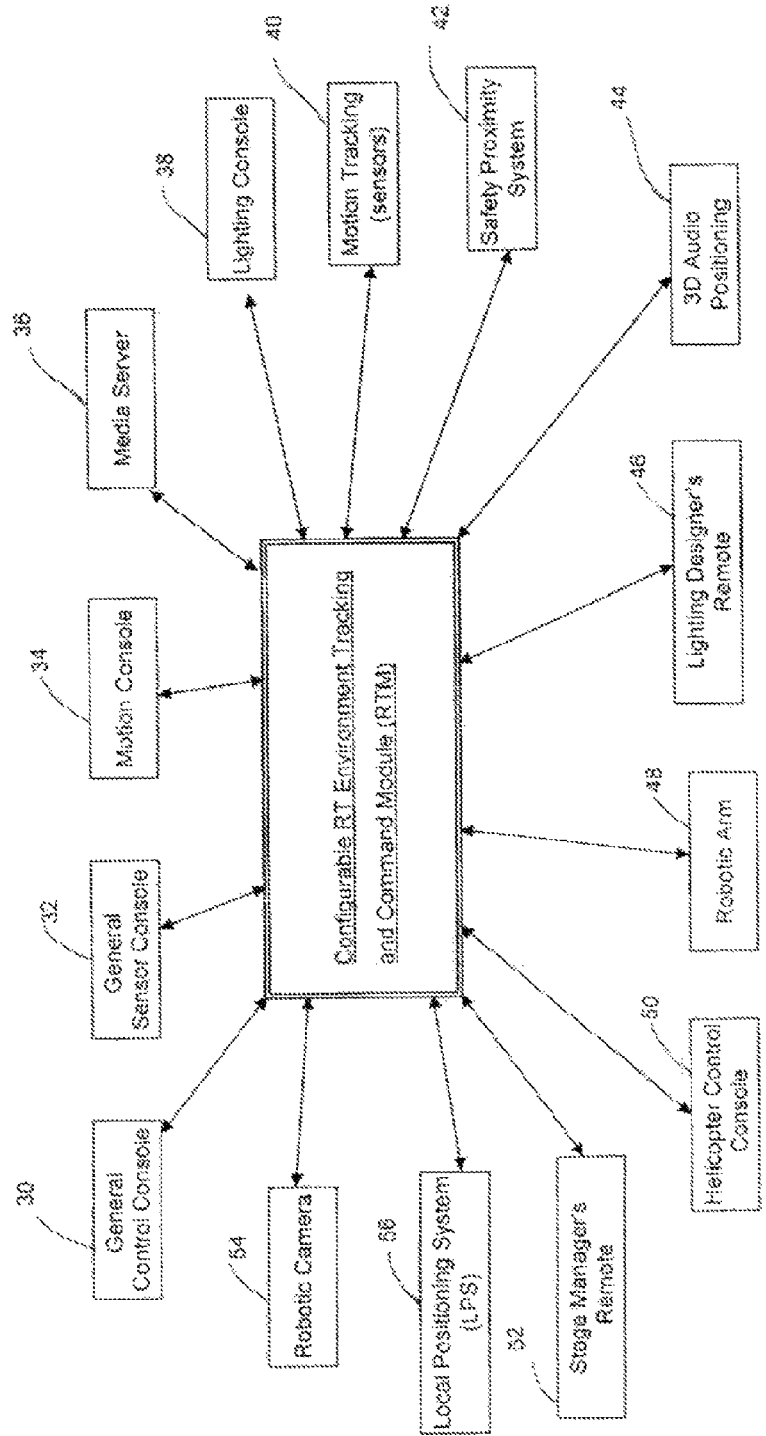
FIG. 2 is a system diagram showing one configuration of a configurable real-time environment tracking and command module (RTM) connected to various devices for tracking or controlling physical objects.

Turning to FIG. 2, an embodiment of a configuration suitable for a RTM 24 to coordinate multiple clients in a theatrical production or environment is provided. The various clients connected to the RTM 24 are able to communicate via the RTM 24, either directly or indirectly. Thus, the RTM 24 facilitates the coordination of the clients and enables the clients to interoperate, even when provided by different vendors. In this example, the clients include a general control console 30, general sensor console 32, motion console 34, media server 36, lighting console 38, motion tracking sensors 40, safety proximity system 42, 3D audio position system 44, lighting designer's remote 46, robotic arm 48, helicopter control console 50, stage manger's remote 52, and robotic camera 54. The stage manager's remote 52, for example, sends commands to the RTM 24 to control the virtual objects in the virtual environment 4, thereby controlling the media server 36, lighting console 38 and helicopter control console 50. There may also be a local positioning system (LPS) 56 to track a helicopter 23a. It can be appreciated that a LPS 56 refers to any device or combination of devices that can determine the location of an object within a localized environment. Examples of devices used in an LPS 56 include RADAR, SONAR, RFID tracking and cameras. Such devices are able to measure or sense various characteristics of the physical environment. It can be appreciated that the number and type of clients connected to the RTM 24 as shown in FIG. 2 is non exhaustive. Further, the RTM 24 is configurable to interact with various numbers and types of clients by providing a common, recognizable interface that the client trusts and will enable to interoperate with other clients that it may not otherwise trust.

The interfacing between a client and the RTM 24 is based on predetermined software protocols that facilitate the exchange of computer executable instructions. In other words, a client sends and receives data and computer executable instructions using a file format that is understood by both the client and the RTM 24. Examples of such a file format include dynamic link libraries (DLL), resource DLLs and .OCX libraries. Thus, a client having a file format which is recognized by the RTM 24 may interface with the RTM 24. Once the software interfacing has been established, clients can interact with the RTM 24 in a plug and play manner, whereby the RTM 24 can discover a newly connected client, or hardware component, with little or no device configuration or with little additional user intervention. Thus, the exchange of data between the client and RTM 24 begins automatically after plugging the client into the RTM 24 through the common interface. It can be appreciated that many types of clients are configurable to output and receive a common file format and thus, many types of clients may advantageously interact with the RTM 24. This flexibility in interfacing reduces the integration time as well as increases the number of the RTM's applications. Also, as noted above, this provides the RTM 24 as a trusted intermediate platform for interoperating multiple client types from multiple vendors.

Figure 3:
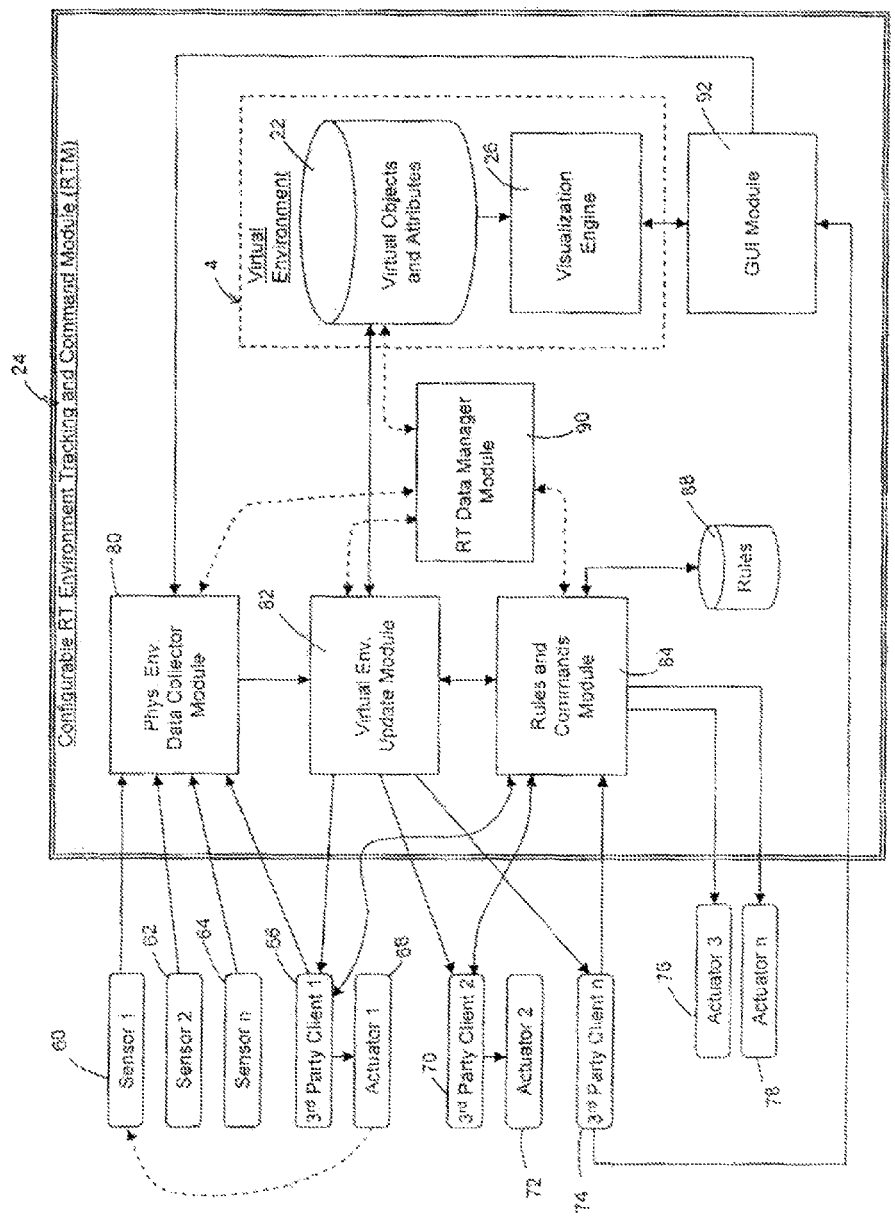
FIG. 3 is a system diagram showing another configuration of a RTM.

Turning to FIG. 3, a configuration suitable for coordinating multiple clients in a physical environment is provided. It can be appreciated that the devices that are external to the RTM 24 and connected to the RTM 24 may be referred to as clients. Therefore, the sensors 60, 62 and 64, the $3^{rd}$ party clients 66, 70 and 74, and the actuators 68, 72, 76 and 78 are considered to be clients to the RTM 24. The RTM 24 comprises a physical environment data collector module 80, a virtual environment update module 82, a rules and commands module 84, a number of rules in a rules database 88, a real-time (RT) data manager module 90, a graphical user interface (GUI) module 92, and virtual environment 4, wherein the virtual environment 4 comprises the virtual objects and attributes database 22 and the visualization engine 26. For clarity, the virtual objects and attributes database 22 is herein referred to as the virtual environment database 22. As can be seen, the virtual environment update module 82 is in communication with the data collector module 80, rules and commands module 84 and virtual environment database 22. The rules and commands module 84 is in communication with the rules database 88. The visualization engine 26 is in communication with the virtual environments database 22 and GUI module 92. It can be appreciated that one or more processors execute the computer instructions from each module or engine. Moreover, the databases can be stored on memory devices, such as random access memory or read only memory devices.

The physical environment data collector module 80, herein referred to as the collector module, is able to receive data from clients, such as sensors 60, 62 and 64, and 3$^{rd}$ Party Client 1 (66). The collector module 80 may comprise or interact with one or more interfaces, not shown, to communicate with the various clients. As can be seen, Sensor 1 (60) tracks the activity or attribute of Actuator 1 (68) and relays the sensed data to the collector module 80. In addition, the collector module 80 can receive commands, for example, from 3$^{rd}$ Party Client 1 (66) and from the GUI module 92, as discussed in greater detail below. Upon receiving the data from the sensors or commands from other consoles, the collector module 80 sends the collected data to the virtual environment update module 82. The virtual environment update module 82, herein referred to as the update module, is able to exchange data with the virtual environment database 22, as well as send or broadcast data to clients, including 3$^{rd}$ Party Client 1 (66), 3$^{rd}$ Party Client 2 (70) and 3$^{rd}$ Party Client n (74). The update module 82 broadcasts data to the clients through one more communication interfaces within the RTM 24. The update module 82 also exchanges information with the rules and commands module 84.

In one example, data about a physical object is sent from Sensor 1 (60) and received by the collector module 80, which in turn transmits the data to the update module 82. The update module 82 sends the data about the physical object to the virtual environment database 22 to update the attribute of the corresponding virtual object. The update module 82 also sends the updated data to 3$^{rd}$ Party Client 2 (70), which may use the data to control Actuator 2 (72).

In another example, 3$^{rd}$ Party Client 1 (66) sends a command (e.g. to move Actuator 3 (76)) to the collector module 80, wherein the collector module 80 then transmits the command to the update module 82. The command triggers a rule, as stored in the rules database 88, which limits the movement of the Actuator 3 (76) since it may collide with another virtual object. In other words, if the predetermined condition of the positions is met, then a response is generated for the physical environment and the RTM 24 provides the response to the Actuator 3 (76). It can be appreciated that a number of predetermined conditions and responses may be stored in the form of rules in the rules database 88. The rule that limits the movement of the Actuator 3 (76) is executed or processed and sent via the rules and command module 84 to the update module 82. Thus, the modified command, now limited according to the rule, is sent from the update module 82 to the virtual environment database 22 thereby updating virtual Actuator 3 (not shown), which corresponds to physical Actuator 3 (76). The modified command is also sent from the update module 82 to the rules and commands module 84, and from there to physical Actuator 3 (76). It can be seen that the rules and commands module 84 is also indirectly in communication with the virtual environment database 22 and monitors any changes therein to determine whether one or more rules should be executed.

In the process of updating the virtual environment database 22, the update module 82 relies on the rules and command module 84 to execute various instructions including, for example, calculations for inverse kinematics, kinematics, and dynamics. The use of inverse kinematics is explained in more detail below.

Continuing with FIG. 3, the information from the virtual environment database 22 may be retrieved by the visualization engine 26 to provide a graphic on a display. In some cases, the visualization engine 26 may interact with a GUI module 92 to allow a user to manipulate a virtual object in the virtual environment 4, which in turn controls the corresponding physical object in the physical environment 2.

For example, when 3$^{rd}$ Party Client n (74) receives an update about a physical object based on the corresponding virtual object from the update module 82, a user of 3$^{rd}$ Party Client n (74) may click and drag that virtual object across a certain distance using the GUI module 92. This manipulation of the virtual object's position is considered a command from the physical environment and is thus relayed to, and received by, the collector module 80.

To facilitate real-time functionality, in the embodiment shown in FIG. 3, a real-time (RT) data manager module 90 is provided. Various other aspects of the RTM 24 may interact with the RT data module 90, including the collector module 80, update module 82, rules and commands module 84 and virtual environment database 22. In one aspect, the RT data manager module 90 processes or relays time-sensitive data (e.g. real-time data) prior to data that is not time-sensitive (e.g. non-real-time data). In another aspect, the RT data manager 90 may also determine time sensitivity or priority for the data and commands collected from the collector module 80.

Since the RTM 24 is a computing device, it can be appreciated that the modules, visualization engine and managers may operate on a single processor or several processors. In some cases, each module may reside on a separate processor, such that a multi-processor system executes the computer instructions of each module in parallel to increase the operable speed of the RTM 24. As such, it is appreciated that the modules and separation of duties exemplified herein is illustrative only and various ones of the modules and/or operations may be implemented in different arrangements to suit the particular application.

Figure 4:
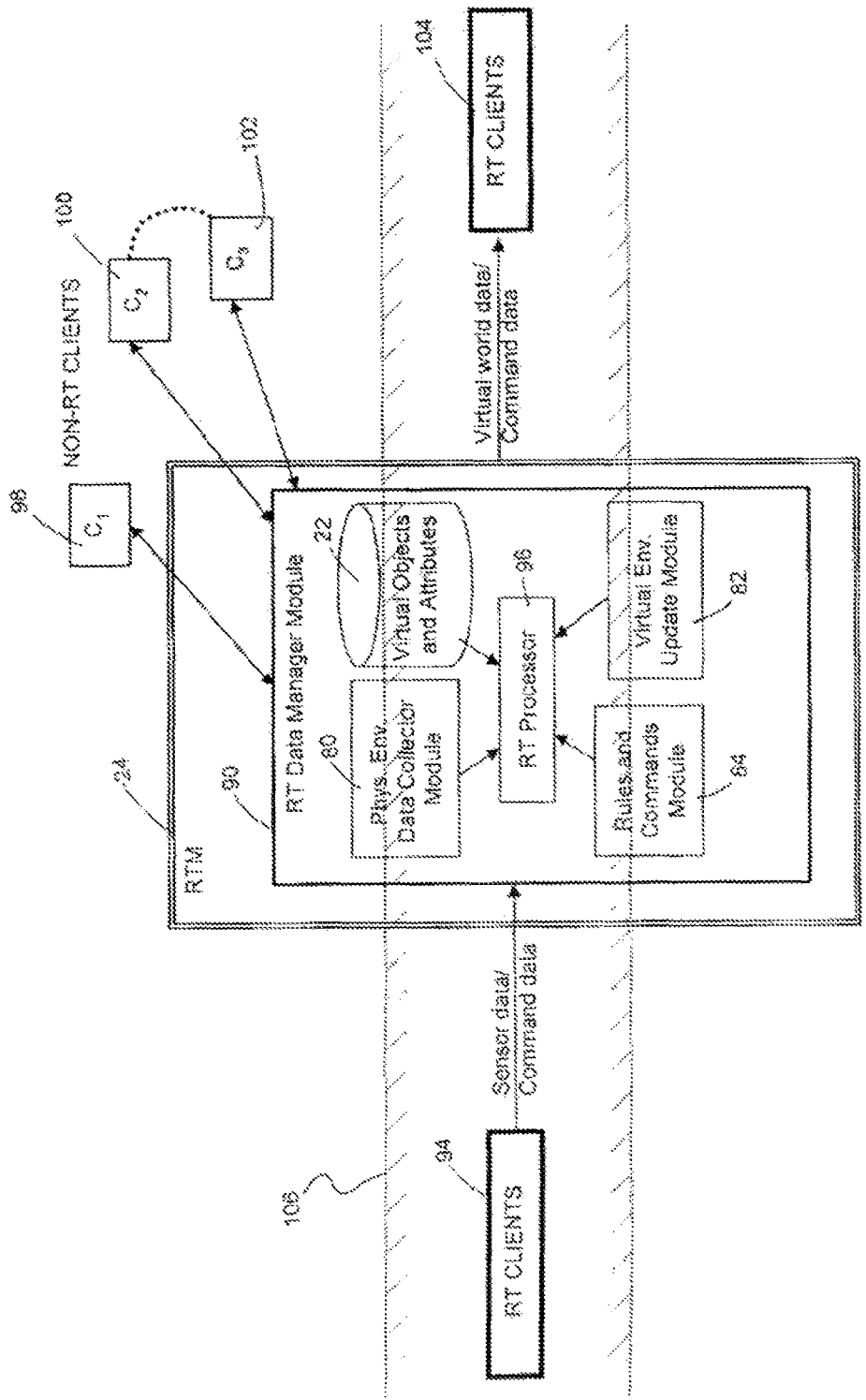
FIG. 4 is a system diagram showing one configuration of data flow through a RTM.

Turning to FIG. 4, a configuration suitable for prioritizing real-time data and commands is provided. It can be appreciated that data and commands may be generally referred to as data or information. In one embodiment, real-time data is considered to be data relating to the three-dimensional position (e.g. X, Y, Z coordinates) as well as the orientation (e.g. roll, pitch and yaw angles). The position and orientation data may be a command calculated by the RTM 24 to position and orient a certain RT client 104 (e.g. a robotic arm) that is controlled by the RTM 24. The position and orientation data may also represent the location of an object that is being tracked by a RT client 94 (e.g. sensors). A RT pipeline 106 is effectively provided to prioritize the transfer and processing of data from RT clients 94. Another example of a RT client includes a robotic spotlight console for following a moving object and sensors to provide positional data about the moving object. Real-time data that is sent from the RT clients 94 is given priority by the RT data manager 90. In the embodiment shown here, the RT data manager module 90 comprises a dedicated RT processor 96 as part of a multi-processor system. The RT processor 96 coordinates the functions of the collector module 80, update module 82, virtual environment database 22, and rules and commands module 84 to process and thereafter, relay data about the virtual environment 4 or commands, or both, to another set of RT clients 104. It can be appreciated that some of the RT clients 104 receiving the virtual data or command data may be the same RT clients 94 sending the data. For example, one RT client 94 may send a command to obtain positional data about an object. That same RT client 104 receives the requested positional data from the RTM 24. In another example, some RT clients may provide sensor data and command data simultaneously.

It can be seen that other non-real-time clients 98, 100, 102 exchange data with the RT data manager module 90. These clients 98, 100, 102 may function without requiring time-sensitive data and therefore, the data provided or requested by these clients may be given lower priority compared to RT clients 94, 104. The RT data manager module 90 identifies that certain portions of the data are non-real-time and thus processes the non-real-time data after the real-time data. It can be appreciated that various configurations suitable for prioritizing real-time data, which comprises commands and measured attributes about physical objects or clients can be applied.

Figure 5:
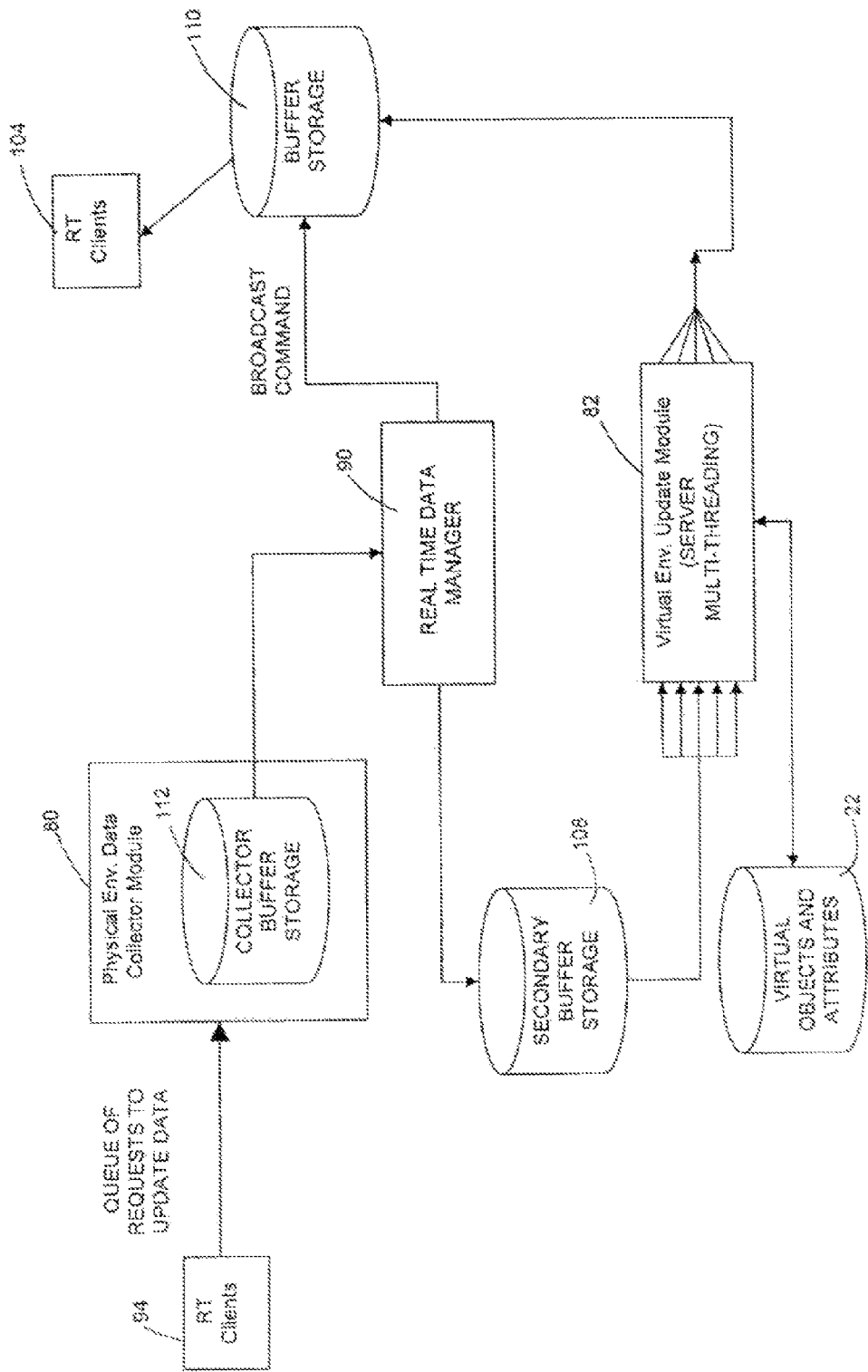
FIG. 5 is a system diagram showing one configuration of data flow within a RTM.

In FIG. 5, a configuration of the RTM 24 is provided showing the flow of data through the RT pipeline 106 for real-time processing. The RT clients 94 provide a queue of requests to provide or receive data, or both. The collector module 80 stores the requests in a collector buffer storage 112. The requests may be organized in the buffer storage using a first-in-first-out (FIFO) system, or may be ordered according to the pre-determined priority of each client. It is appreciated that requests from the RT clients 94 may be organized in various ways.

At a certain time interval, for example every 5 milliseconds, the RT data manager module 90 transfers the requests or data from the collector buffer storage 112 and moves it into a secondary buffer storage 108. It can be appreciated that the collector buffer storage 112 quickly clears its memory by transferring the data to the secondary buffer 108, thereby allowing the collector buffer storage 112 to resume collecting data from clients. This configuration is referred to as double buffering. The update module 82 processes the data in the secondary buffer storage 108 and may also execute computer instructions to determine the inverse kinematics of certain virtual objects. The update module 82 exchanges data with the virtual environment database 22 to update or retrieve information as per the requests in the secondary buffer storage. The update module 82 then stores data to be sent to the RT clients 104 to a broadcasting buffer storage 110.

Although not shown, the update module 82 may also rely on the rules and command module 84 to calculate inverse kinematics to generate commands for the desired position (e.g. X, Y, Z coordinates) and orientation (e.g. roll, pitch and yaw angles) of certain clients. The rules and command module 84 then transmits the commands through the update module 82, or directly to the broadcasting buffer storage 110.

Continuing with FIG. 5, in the next time interval, the RT data manager broadcasts the information stored in the broadcasting buffer storage 110 to the RT clients 104. In one embodiment, after the information is broadcasted, the broadcasting buffer storage 110 is cleared of its data.

It can be understood that the buffer storages 112, 108 and 110 allow for several operations to occur simultaneously. For example, while requests are being collected from RT clients 94 by the collector module 80, the update module 82 may be simultaneously executing computer instructions and exchanging information with the virtual environment database 22. Further, while data or information is being moved from the collector buffer storage 112 to the secondary buffer storage 108, the data or information in the broadcasting buffer storage 110 may be simultaneously sent to the RT clients 104. This configuration makes use of double buffering to reduce the delay in input or output operations. This simultaneous function is an aspect of the RTM's 24 real-time operability. It can be appreciated that the real-time response may vary. In one embodiment, the RTM 24 can receive, process and transmit data within 5 milliseconds.

Various communication configurations also allow for real-time operation to exchange data between the RTM 24 and clients, such as sensors, control devices, and ancillary computers. One configuration includes each client communicating with the RTM using data protocols suitable for high performance and adaptable to various other software and hardware types. Possible data protocols include without limitation UART, I2C, and SPI. Another communication configuration includes providing redundant communication algorithms to increase consistent and reliable transmission and processing of data. It can be appreciated that when large amounts of data is transmitted in real-time, some of the data from the clients may not be successfully transmitted to the RTM 24, or is "dropped". If the data is not successfully received by the RTM 24, the RTM 24 continues to retrieve more recent data. However, data from clients that are considered critical, such as data from a safety proximity sensor, is received by the RTM 24 more reliably, which increases traffic and processing, but guarantees the receipt and accuracy of that data. When transmitting critical data, the RTM 24 may transmit the same data multiple time to ensure the client receives it. The RTM 24 may also increase reliability by transmitting a verification receipt to the client, whereby the client sends back the verification receipt. When the RTM 24 receives the verification receipt, the RTM 24 verifies that the client has received the critical data. Thus, data that is critical might be updated less frequently than other real-time data due to extra-processing, but is given priority by the RTM 24 and transmitted with little to no delay.

Figure 6:
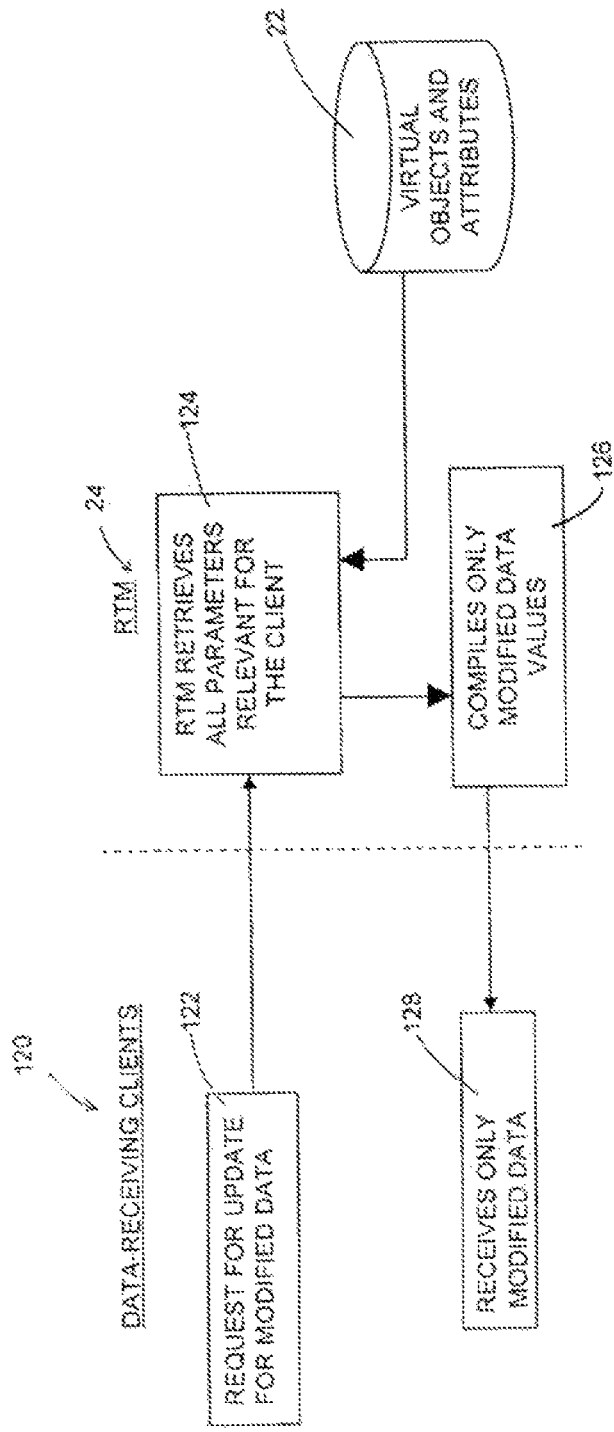
FIG. 6 is a flow diagram illustrating computer executable operations of a client exchanging virtual environment data with a RTM.

Turning to FIG. 6, a method for updating data is illustrated. In this example, a data receiving client 120 requires the position of a first object and a second object in a physical environment being monitored by the RTM 24. In a preferred embodiment, a data receiving client 120 sends a request (step 122) to the RTM 24 to obtain only modified data. In this example, modified data refers to positional data about the first or second object which has changed since the last information update transmitted to the client 120. At step 124, the RTM 24 retrieves data from the virtual environment database 22 that is relevant to the client's request 122. In this example, the positional data of the first and second objects are retrieved. The RTM 24 then determines that only the first object has changed position since the last update and thus, compiles the modified data (step 126). Therefore, the changed position of the first object is transmitted to the client 120 at step 128. The position for the second object did not change since the last transmission to the client 120 and thus, the RTM 24 did not transmit the second object's position to the client 120. It can be seen that this method requires less data to be transmitted, thereby reducing the time required to transmit data. It can be appreciated however, the method of providing a full update, which disregards whether data has changed since the previous transmission, is also applicable to operation of the RTM 24.

In an other embodiment, RT clients may not need to send a request to obtain updated data from the virtual environment database 22. Instead, the RTM 24 may automatically transmit updated data from the virtual environment database 22 to a RT client without receiving a request. This may also reduce the computational load, thereby facilitating real-time operation.

It can therefore be seen that various configurations in the software and hardware suitable for real-time operation are applicable to the principles herein.

In another aspect of the RTM 24, the RT clients, such as, for example, RFID, RADAR, SONOR, and WiFi devices, may transmit data to the collector module 80 at a frequency that is not subject to extraneous interference due to local noise. The high frequency transmission or high refreshment rate can provide a stream of data to the RTM 24, thereby reducing data error or delay caused by extraneous interference. It can be appreciated that a higher frequency transmission of data may increase the number of instances of data error, but the RTM 24 will disregard or filter out bad data and only process successfully transmitted data. At high frequency, however, there will also be a greater number of successfully transmitted data instances in a shorter time period, thus, reducing delay.

In general, the RTM 24 may provide several advantages, including substantially reducing the amount of effort required by a human operator to coordinate one or more than one device in an environment with low predictability. Another advantage is that the RTM 24 can increase the ability to coordinate many devices and operations with reduced time and cost. Moreover, the RTM 24 can coordinate devices more consistently compared to a human operator.

Figure 7:
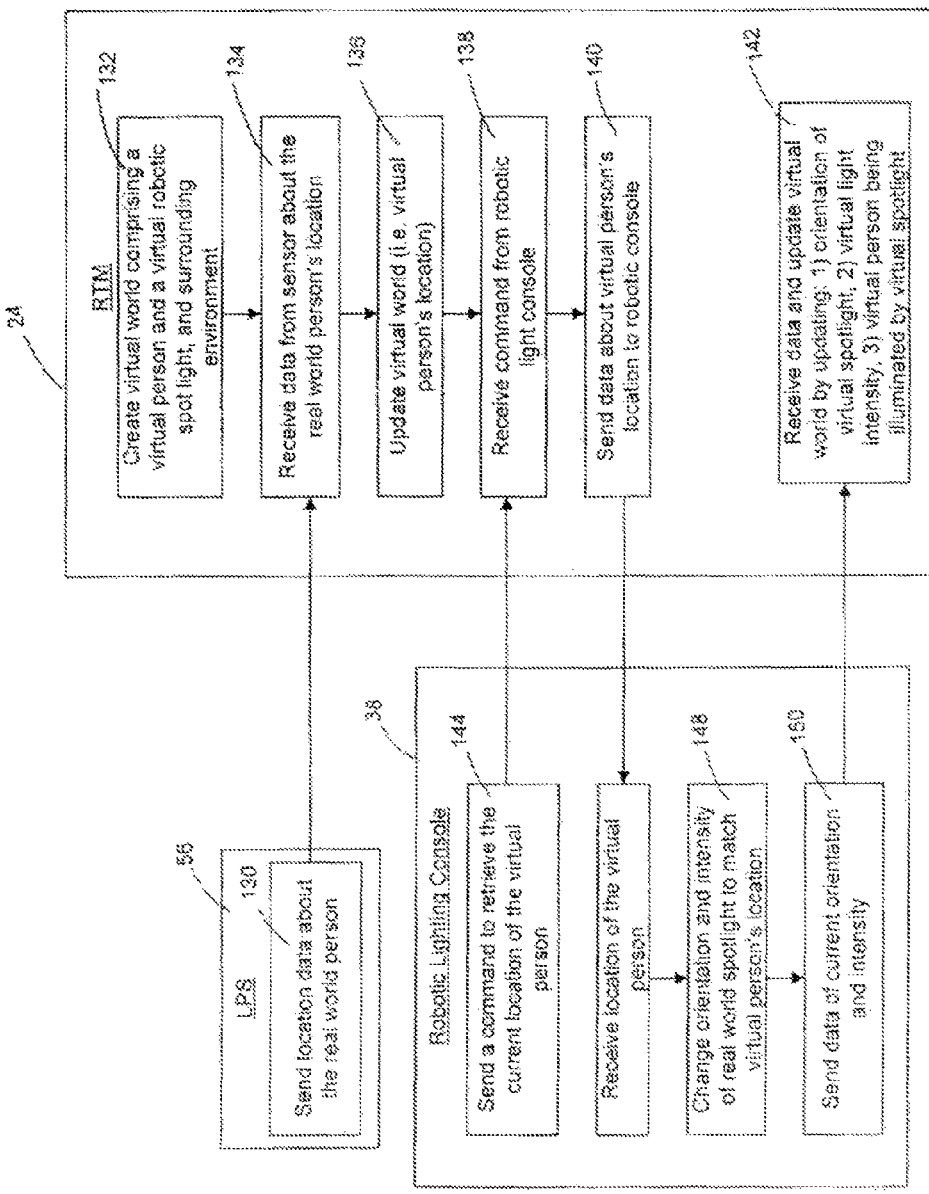
FIG. 7 is a flow diagram illustrating computer executable operations for a RTM interacting with two clients including a local positioning system and robotic light console.

Examples of the RTM 24 coordinating one or more clients are provided below. Turning to FIG. 7, an example is provided wherein a robotic lighting console 38 is tasked to shine a spotlight on a person moving within in a physical environment 2. Therefore, as the person moves, the spotlight moves to keep the person illuminated. In order to determine the location of the person, a local positioning system (LPS) 56 is used to track the person. The RTM 24 communicates with both the LPS 56 and robotic lighting console 38 to coordinate the information. For clarity, the person in the physical environment may be herein referred to as the physical person. First, at step 132, a virtual environment is created comprising at least the elements tracked by the RTM 24. Thus, the virtual environment database 22 includes a virtual person, which corresponds to the physical person, and a virtual robotic spotlight, corresponding to the physical robotic lighting console 38. In other words, attributes of the clients and objects are mapped onto the corresponding virtual representations in the virtual environment database 22. The virtual environment database 22 may also include additional virtual objects corresponding to objects in the physical environment. At step 130, the LPS 56 sends positional data about the physical person to the RTM 24. At step 134, the RTM 134 receives the data from the LPS 56 about the physical person's position and then updates the virtual environment database 22 accordingly at step 136. Therefore, the virtual person's location matches or corresponds to the physical person's location. In parallel, or as shown sequentially, the robotic lighting console 38 sends a command to the RTM 24 to retrieve the current location of the virtual person (step 144). The RTM 24 receives the command from the robotic lighting console (step 138) and, in response, sends the requested data about the virtual person's location back to the robotic lighting console 38 (step 140). Upon the robotic lighting console 38 receiving the location of the virtual person (step 146), the robotic lighting console changes orientation and lighting intensity of the physical spotlight in accordance with the virtual person's location (step 148). Since the virtual person's location matches or corresponds with the physical person's location, the physical spotlight illuminates the physical person. The updated or current orientation and lighting intensity of the robotic lighting console 38 is transmitted to the RTM 24 (step 150). Using this information, the RTM 24 updates the virtual environment 22, and more particularly the attributes of each virtual object (step 142). Thus, the virtual spotlight's orientation and lighting intensity are updated to match the physical spotlight. In addition, based on the visual spotlight's updated orientation and lighting intensity, the RTM 24 calculates that the virtual person is illuminated by the virtual spotlight. It can be appreciated that the RTM's update module 82 may perform such calculations.

Figure 8:
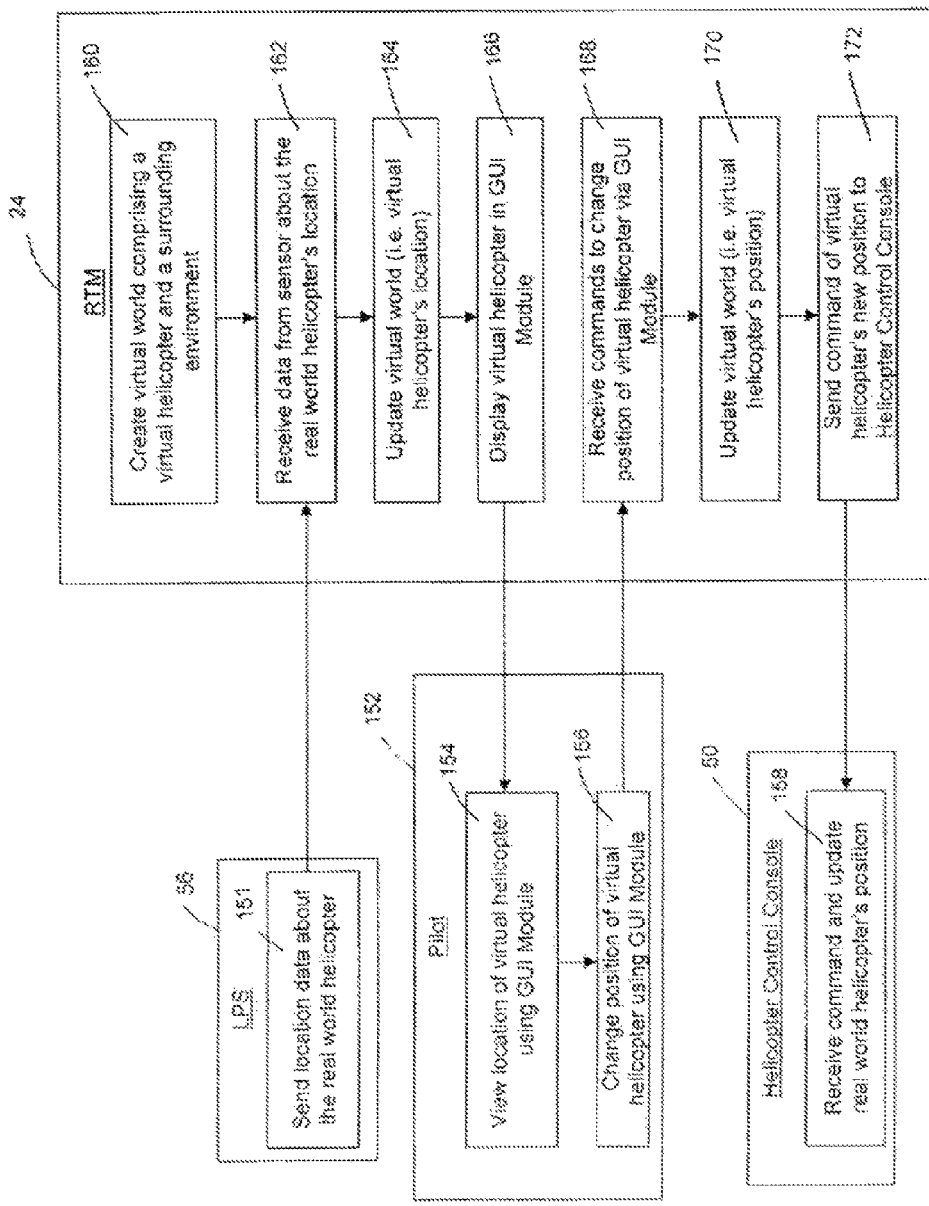
FIG. 8 is a flow diagram illustrating computer executable operations for a RTM interacting with several clients including a local positioning system, pilot, and helicopter control console.

In FIG. 8, another example is provided wherein a pilot 152 is trying to fly an unmanned helicopter or helicopter drone 23a in a physical environment. The RTM 24 coordinates the LPS 56, the pilot 152, and the helicopter control console 50. At step 160, a virtual environment is created to correspond with the physical environment in which the helicopter drone 23a is operating within. Moreover, a virtual helicopter object 23b is created with several attributes, such as shape, weight, velocity and acceleration. In other words, at least one attribute about at least one physical object is mapped onto at least one corresponding virtual object to create a virtual environment comprising one or more virtual objects. These virtual objects are entered into the virtual environments database 22. The LPS 56, at step 151, sends location data and other attributes, such as velocity and acceleration, about the helicopter drone 23a to the RTM 24. The collector module 80 in the RTM 24 receives the data about the helicopter drone's position (step 162), and the RTM 24 updates the virtual environment database 22 accordingly (step 164). Thus, the virtual helicopter's position in the virtual environment matches or corresponds to the helicopter drone's position in the physical environment relative to the virtual reference point 7b and physical reference point 7a, respectively. To provide visual feedback to the pilot 152, the visualization engine 26 displays the virtual helicopter 23b as it corresponds to the current orientation and position of the helicopter drone 23a (step 166). The display is shown in a GUI module 92, which allows the pilot to view the virtual environment and interact with the desired position of the virtual helicopter 23b through a touch screen, joystick, hand controller, keyboard, mouse, or any other input devices and combinations thereof. Thus, the pilot 152 does not need to maintain a line of sight with the helicopter drone 23a since the visualization engine 26 and GUI module 92 provide sufficient visual feedback. At step 154, the pilot views the location of the virtual helicopter 23b using the GUI module 92. The pilot then charts a desired flight path for the virtual helicopter 23b, and by association the helicopter drone 23a, using the GUI module 92 (step 156). The GUI module 92 receives the pilot's commands to change the position of the virtual helicopter 23b (step 168). The commands for the helicopter's desired position are then sent to the collector module 80. The commands are then updated in the virtual environment database 22 according to the virtual helicopter's 23b new position (step 170). The RTM 24 then sends the updated position of the virtual helicopter 23b as a command to the helicopter control console 50 (step 172). This client 50 receives the command from the RTM 24 and sends a control signal to the helicopter drone 23a to reposition itself according to the location of the virtual helicopter's 23b position (step 158). It can be appreciated that various other devices may be controlled or coordinated in a similar manner according the principles described herein.

Figure 9:
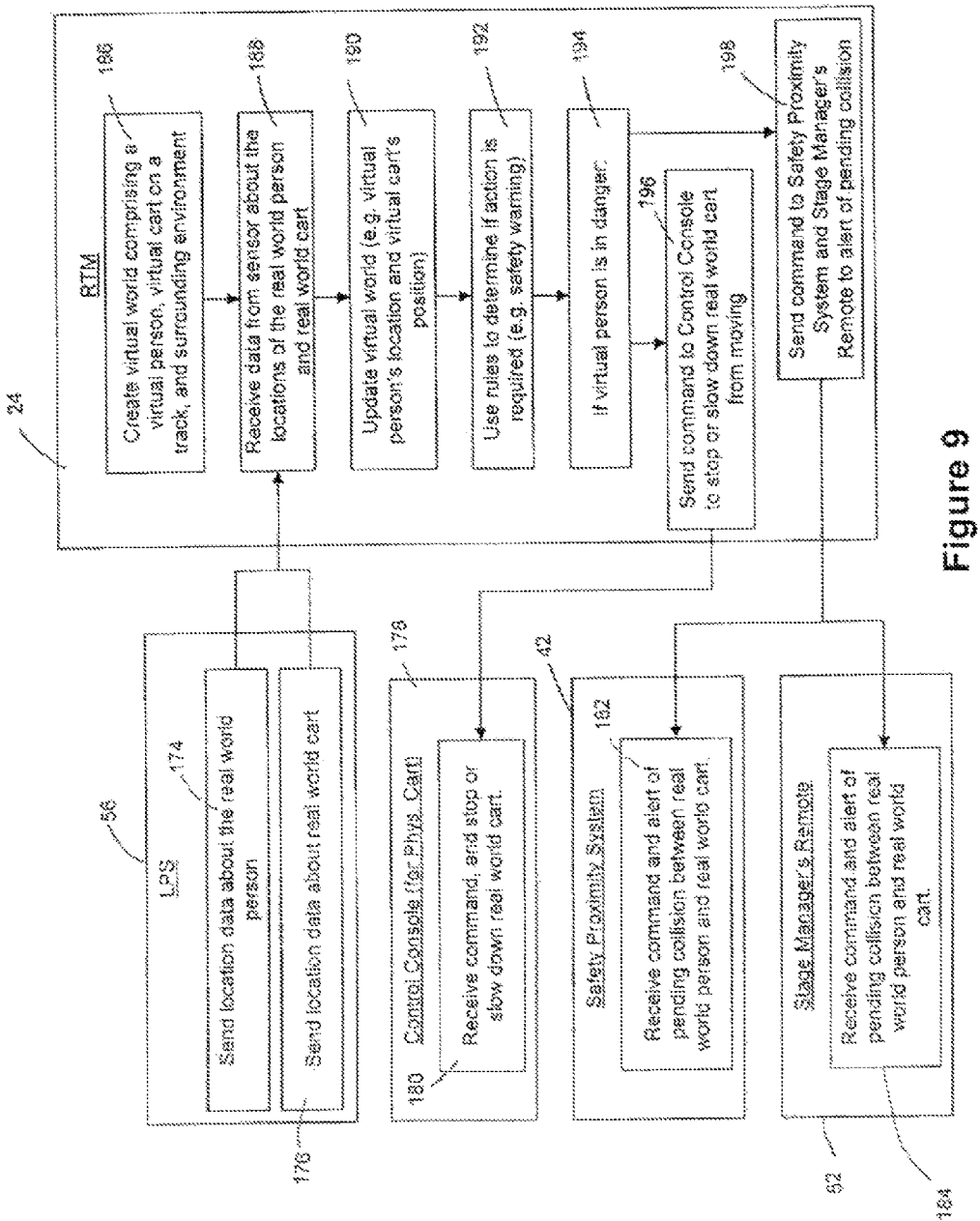
FIG. 9 is a flow diagram illustrating computer executable operations for a RTM interacting with several clients including a local positioning system, control console, safety proximity system and a stage manager's remote.

Turning to FIG. 9, and with reference to FIG. 1, an example is provided wherein the person, or physical person, 14a is moving in a physical environment 2, such as walking on a platform 18a. A robotic cart, not shown, moves across the platform 18a along a track. A safety proximity system 42 is provided to reduce the danger of the robotic cart hitting the person 14a. In FIG. 9, a flowchart representing the transfer of information is shown. In step 186, a virtual environment is first created comprising a virtual person 14b, a virtual cart on a virtual track, a virtual platform 18b, and any other objects or attributes that may generally correlate the virtual environment 24 with the physical environment 2. The LPS 56 sends location data about the person 14a and the robotic cart to the RTM 24 (step 174 and step 176). The RTM 24 receives the sensor data about the locations of the person 14b and robotic cart (step 185) and then updates the virtual environment database 22 using the sensor data (step 190). At step 192, the RTM 24 determines if the locations or travel paths of the virtual person 14b and the virtual cart may cause danger. This determination may be calculated based on the rules from a rules database 88 and the rules and command module 84. It can be appreciated that the rules in the rules database 88 may be based on various algorithms, such as fuzzy logic, neural networks, pattern recognition, or other control logic. In this example, the rules have determined that the virtual person 14*b* is in danger of colliding with the virtual cart (step 194). The RTM 24 then sends commands to the robotic cart's control console 178, the safety proximity system 42 and the stage manager's remote 52 in parallel, as shown, or in serial. The RTM 24 sends a command to the control console 178 to slow down or stop the robotic cart from moving (step 196). The RTM also sends a command to the safety proximity system 42 and the stage manger's remote 52 (step 198) to alert of a pending collision between the virtual cart and virtual person 14*b*. In response, the control console 178 slows down or stops the robotic cart from moving (step 180). The safety proximity system alerts the person 14*b* that there is a pending collision between the person 14*a* and the robotic cart (step 184). A stage manager may have a console to receive and transmit data or commands through a stage manager's remote 52. Upon receiving the command from the RTM 24, the stage manager's remote 52 alerts the stage manager of a pending collision between the person 14*a* and the robotic cart (step 184).

Figure 10A:
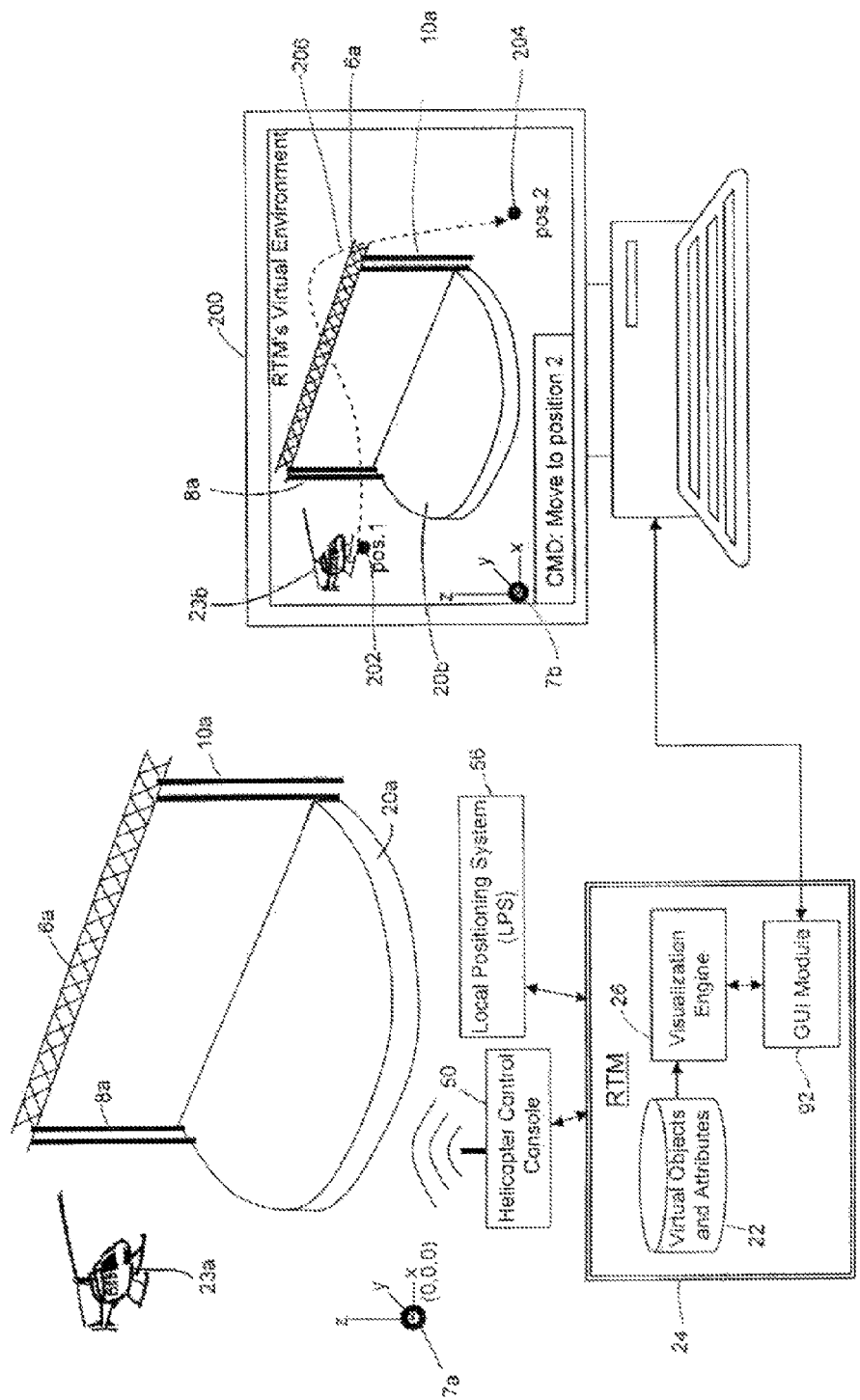
FIG. 10a is a system diagram showing another configuration of a RTM interacting with several clients and the physical environment, including a helicopter drone in a first position.

Turning to FIG. 10*a*, a configuration of a RTM 24 is illustrated interacting with several clients and a physical environment. In the physical environment shown in FIG. 10*a*, there is a lower platform 20*a*, two vertical supports 8*a*, 10*a*, an overhead truss 6*a* and a helicopter drone 23*a* hovering in a first position. It can be appreciated that the method described with respect to FIG. 8 may be applied to the configuration shown in FIG. 10*a*.

The helicopter drone 23*a* is being wirelessly controlled by a helicopter control console 50. A LPS 56 tracks the location and orientation of the helicopter drone 23*a*. Both clients 50, 56 are interfaced with the RTM to exchange data. There is also a computer station or pilot console 200 that allows a human operator or pilot to remotely view and control the helicopter. For example, the helicopter drone 23*a* may be flying in a dark environment where no lighting is available. Thus, a pilot would not be able to see the helicopter using the naked eye. However, the visualization that is displayed through the computer station 200 allows the pilot to determine the location of the helicopter. It can be appreciated that the computer station 200 is also a client of the RTM 24.

Continuing with FIG. 10*a*, the objects in the physical environment are represented as virtual objects, having the same dimensions and locations, in the virtual environment database 22. In one aspect, the virtual environment database 22 is populated first with virtual objects that correspond to physical objects and their respective attributes. Then, the RTM 24 is able to track the helicopter drone 23*a* using the LPS 56 and the virtual helicopter drone 23*b* in the virtual environment database 22. The location of the virtual helicopter drone 23*b* in context with other virtual objects is displayed using the visualization engine 26. The GUI module 92 allows the displayed virtual environment to become interactive. Thus, the computer station 200 interfaces with the GUI module 92 and displays a graphic of the virtual environment to the pilot.

In the displayed virtual environment, the computer station 200 shows that the virtual helicopter drone 23*b* is at a first position 202. The pilot may draw a flight path 206 in to the virtual environment, such that the virtual helicopter drone 23*b* will fly along this path 206 to a second position 204. The pilot draws a path 206 such that the virtual helicopter drone 23*b* does not interfere or collide with other virtual objects, such as the virtual truss 6*b* or the platform 20*b*. By correlating the virtual and physical environments, the helicopter drone 23*a* will thereby avoid the physical obstacles represented in the virtual environment. Upon executing this command, the computer station 200 transmits the command to the GUI module 92. In response, the RTM 24 sends a command to the helicopter control console 50 to fly the helicopter drone 23*a* along the path 206.

Figure 10B:
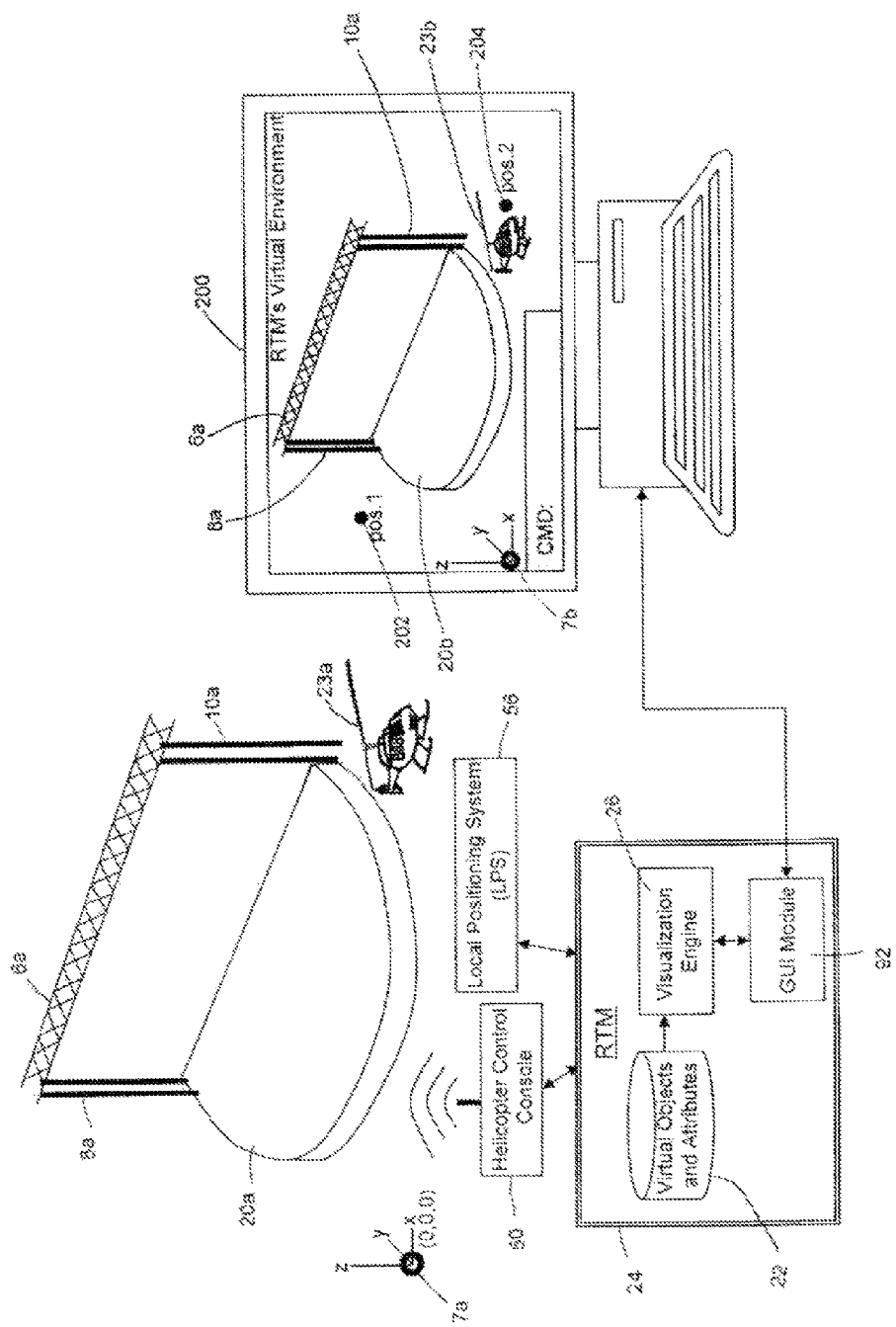
FIG. 10b is a system diagram showing the configuration of a RTM according to FIG. 10a, with the helicopter drone in a second position.

Turning to FIG. 10*b*, the helicopter drone 23*a* is shown hovering at a new position. The LPS 56 provides feedback to the RTM 24 about the helicopter drone's position. In turn, the RTM 24 provides the corresponding control signals or modified feedback signals to the helicopter control console 50. The virtual environment is updated in real-time to display to the computer station 200 the current position of the virtual helicopter drone 23*b*, which corresponds to the physical location of the helicopter drone 23*a*. In FIG. 10*b*, the virtual helicopter drone 23*b* is shown in the second position 204 on the display of the computer station 200.

Figure 11:
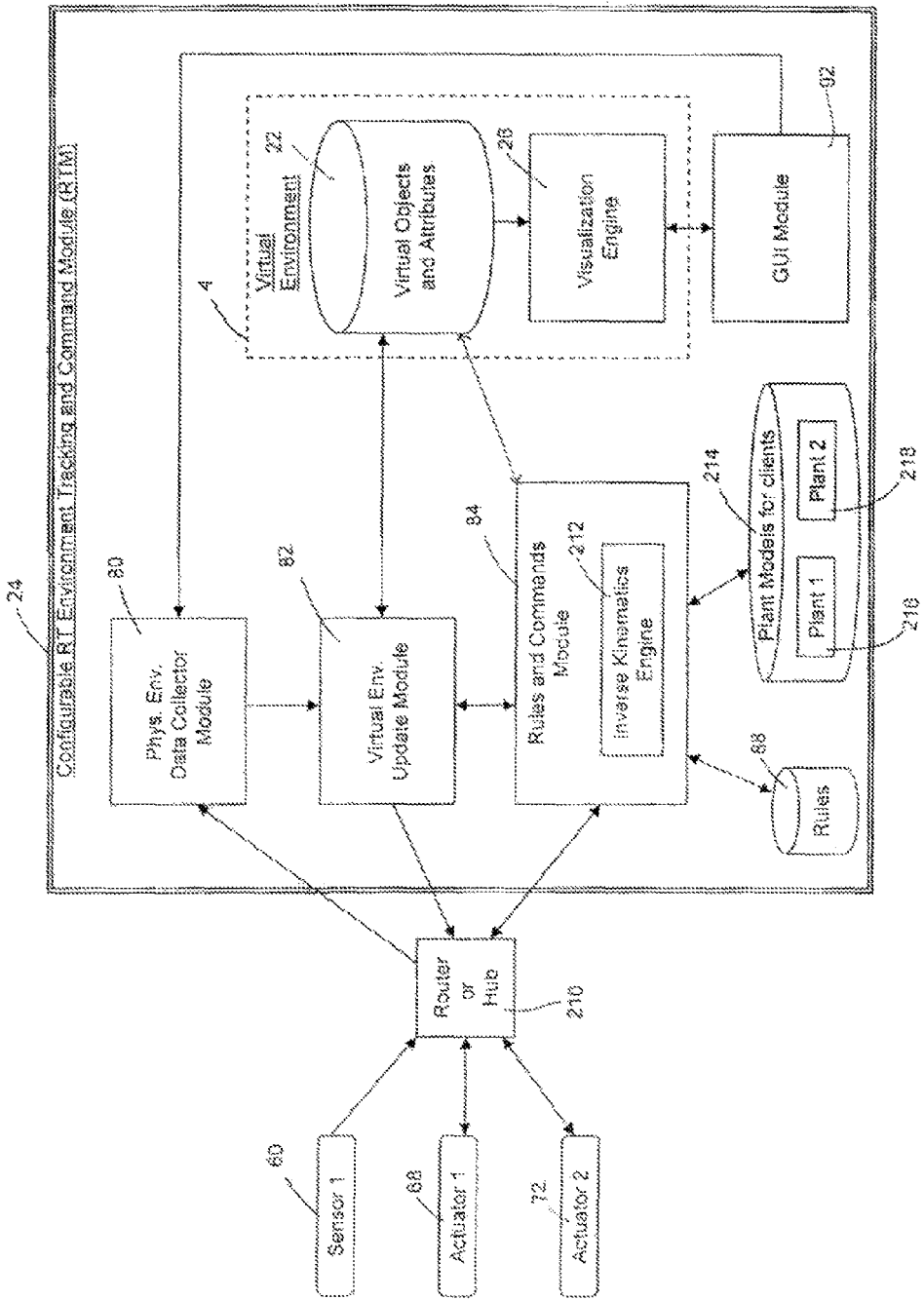
FIG. 11 is a system diagram showing a configuration of a RTM connected to a router.

Turning to FIG. 11, another configuration for an RTM 24 is provided. The clients interact with the RTM 24 through a router or hub 210. In particular, Sensor 1 (60), Actuator 1 (68) and Actuator 2 (72) exchange data with the router 210. The router 210 transmits data and commands from the clients to the collector module 80. The router 210 also receives data from the update module 82 and exchanges data with the rules and commands module 84.

It can be appreciated that the rules and commands module 84 can provide command data to the clients. For example, Actuator 1 (68) may require command data in order to execute certain actions. Actuator 1 (68) may have a feedback control system comprising a controller, a plant and a feedback sensor to determine the state of the actuator. In many feedback control systems, a reference value r is provided to the controller to generate a control signal u to affect the behaviour of the actuator, or plant. The goal in many feedback control systems is that the actuator or plant outputs a value or action that corresponds closely to the reference value r. It can be understood that a plant refers to a mathematical model of the actuator, or any other device, that represents the behaviour of the device. The mathematical model may be linear or non-linear and time invariant or time variant. In this example, in order for the RTM 24 to control Actuator 1 (68), the RTM 24 provides Actuator 1 (68) with a reference value r. If Actuator 1 (68) is able to translate and rotate in all six degrees of freedom, then the RTM 24 provides a reference value r which comprises three dimensional position (e.g. X, Y, Z coordinates) and orientation (e.g. roll, pitch and yaw angles). The interaction between the RTM 24 and the control system of the actuators is described below.

It can be appreciated that different devices behave differently. For example, Actuator 1 (68) may be more responsive or faster than Actuator 2 (72). Thus, different devices may have different mathematical models to represent the different behaviours in the electrical or mechanical functions of each device. Continuing with FIG. 11, each of the actuators have their own respective mathematical models or plants. A plant models database 214 in the RTM 214 stores Plant 1 (216) and Plant 2 (218) which correspond to Actuator 1 (68) and Actuator 2 (72), respectively.

A client's plant can be loaded into the plants model database 214 when first interfacing a client to the RTM 24. For example, Plant 2 (218) may reside within Actuator 2 (72). Thus, when Actuator 2 (72) is connected to the RTM 24, the RTM 24 automatically begins downloading Plant 2 (218) from Actuator 2 (72). Alternatively, a technician may load or install Plant 2 (218) directly into the RTM 24.

Upon loading Plant 2 (218) and connecting Actuator 2 (72), a technician may link Actuator 2 (72) to one or more virtual objects in the virtual environment database 22. Rules may also be generated or selected from a pre-existing list in the rules database 88 to govern how the Actuator 2 interacts with the virtual objects. For example, Actuator 2 (72) may be a robotic light that is linked to a virtual helicopter drone. The rule would be that the robotic light points a light on the virtual helicopter drone, thus following the helicopter drone. In order to accomplish this rule, the RTM 24 must provide a command to the Actuator 2 (72), that is the robotic light, to move in certain way to point the light at the helicopter. The commands are calculated using the inverse kinematics engine 212, which is part of the rules and commands module 84.

The inverse kinematics engine 212 is particularly useful when controlling an actuator with rotational joints, also referred to as a kinematic chain. In order for the actuator to move to a desired position, the actuator must rotate certain joints by a certain number of degrees. The inverse kinematics engine 212 determines the required number of degrees of rotation for an actuator's joint. The required degrees of yaw, pitch or roll, or combinations thereof, to move the actuator to a certain position are transmitted by the RTM 24 as command reference value r. The inverse kinematics engine 212 takes into account the position of a virtual object, which relates to the desired position of the actuator, and the plant of the actuator.

Figure 12:
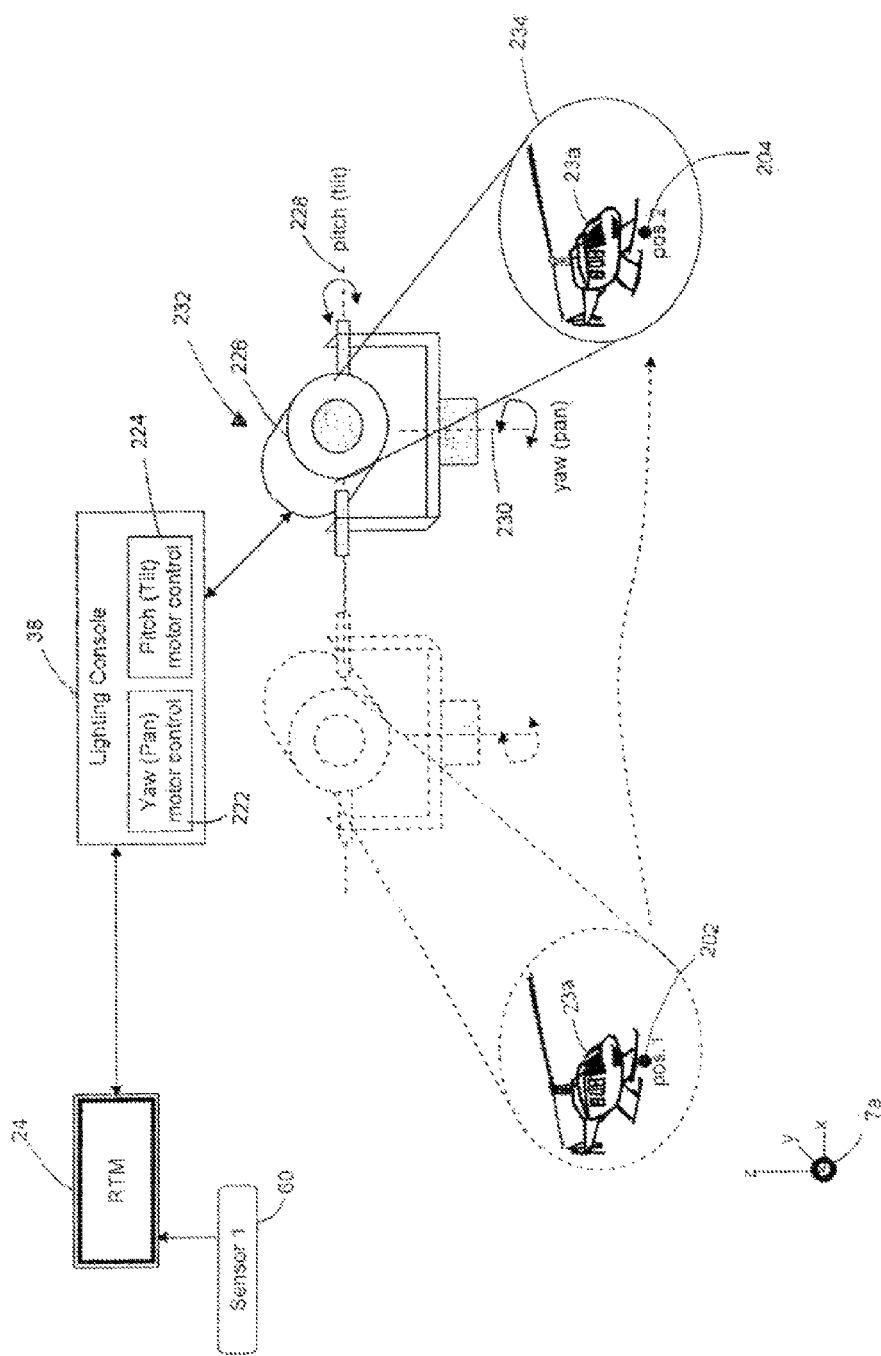
FIG. 12 is a system diagram of a RTM, lighting console and robotic light interacting with one another.

In FIG. 12, an example of a lighting console 38 for controlling a pan and tilt robotic light 232 is provided. The robotic light 232 comprises a pan and tilt assembly or turret, that allows a light 226 mounted thereon to yaw (or pan) and pitch (or tilt). The turret comprises a yaw motor that rotates the light 226 about the yaw axis 230, and a pitch motor that rotates the light 226 about the pitch axis 228. The robotic light 232 is controlled by the lighting console 38, which includes a yaw motor controller 222 and a pitch motor controller 224 to orient the light 226 at various angles. In this example, the robotic light 232 is trying to point a spotlight 234 on a moving helicopter drone 23a. The lighting console 38 outputs control signals to the yaw and pitch motors in order to rotate the light 226 so that it faces the helicopter drone 23a.

The amount of rotation around the yaw axis 230 and pitch axis 234 is determined by the RTM 24. In particular, the RTM 24 provides a yaw reference value $r_y$ to the yaw motor controller 222 and a pitch reference value $r_p$ to the pitch motor controller. Based on these reference values the yaw motor controller 222 and pitch motor controller 224 drive the motors in the robotic light 232, which in turn rotates the light 226 to move the spotlight 234 in translation across three dimensional space.

Figure 13:
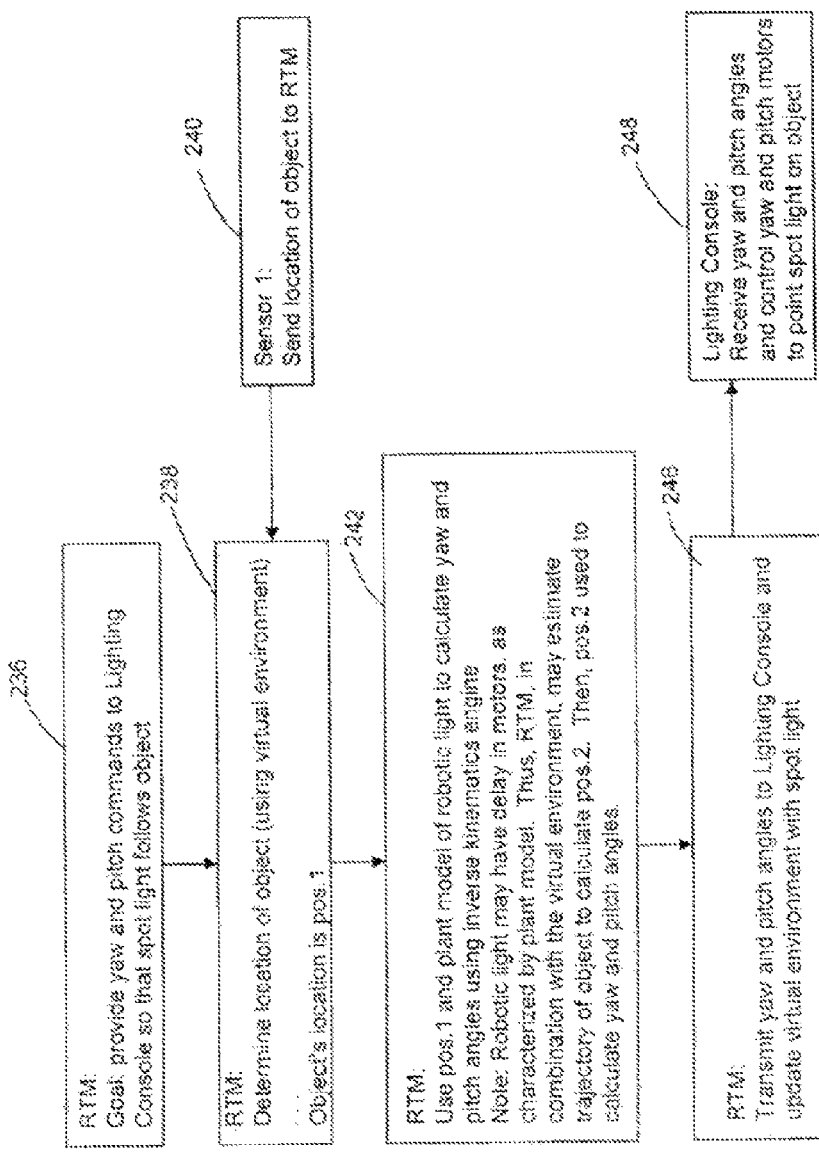
FIG. 13 is a flow diagram illustrating computer executable operations for the RTM shown in FIG. 12.

The RTM 24 calculates the reference values $r_y$ and $r_p$ based on the desired position of the spotlight 234. Turning to FIG. 13, a process is provided showing the relation between the inverse kinematics engine 212 with the RTM's control scheme. It can be seen that FIG. 13 relates to the elements shown in FIGS. 11 and 12. As per step 236, a rule in the rules database 88 correlates the desired position of the spotlight 234 with the position of the helicopter drone 23a. In step 238 and step 240, the physical position of the helicopter drone 23a is determined by Sensor 1 (60) relative to a predetermined reference point or origin 7a in the physical environment. As shown in FIG. 12, the helicopter drone 23a travels from position 1 (202) to position 2 (204). The update module 82 uses the data from Sensor 1 (60) to update the location of the virtual helicopter drone 23b in the virtual environment database 22. The location of the virtual helicopter drone 23b is the tracking point of the robotic light 232. In step 242, the inverse kinematics engine 212 uses the location provided from the update module 82 to calculate the reference values. The inverse kinematics engine 212 also relies on the plant model of the robotic light 232, which includes mathematical representation of the rotational speeds, range of rotation, and other behavioural aspects of the robotic light 232. Thus, based on the plant model and desired position, the inverse kinematics engine 212 calculates the required angle of rotation around the pitch and yaw axes 228, 230 for the robotic light 232 to point a spotlight 234 in the desired position. In step 246, the RTM 24 transmits the calculated reference values $r_y$ and $r_p$ to lighting console 38.

Continuing with FIG. 13, in step 248, upon receiving the command data containing the reference values $r_y$ and $r_p$, the lighting console 38 drives the yaw and pitch motors to rotate the light 226 to point the spotlight 234 at position 2 (204), where the helicopter drone 23a is currently positioned.

It can therefore be seen that the RTM 24 advantageously connects sensor and actuator devices, and provides the controllers on the actuator devices with position or orientation data. The combination of the virtual environment database 22, update module 82 and inverse kinematics engine 212 allows for a flexible and accurate control scheme with particular utility to actuators that rotate. It can be appreciated that the rules and commands module 84 may also provide other control schemes in combination with the update module 82 and virtual environment database 22 to control other clients, which are not limited to actuators.

Figure 14:
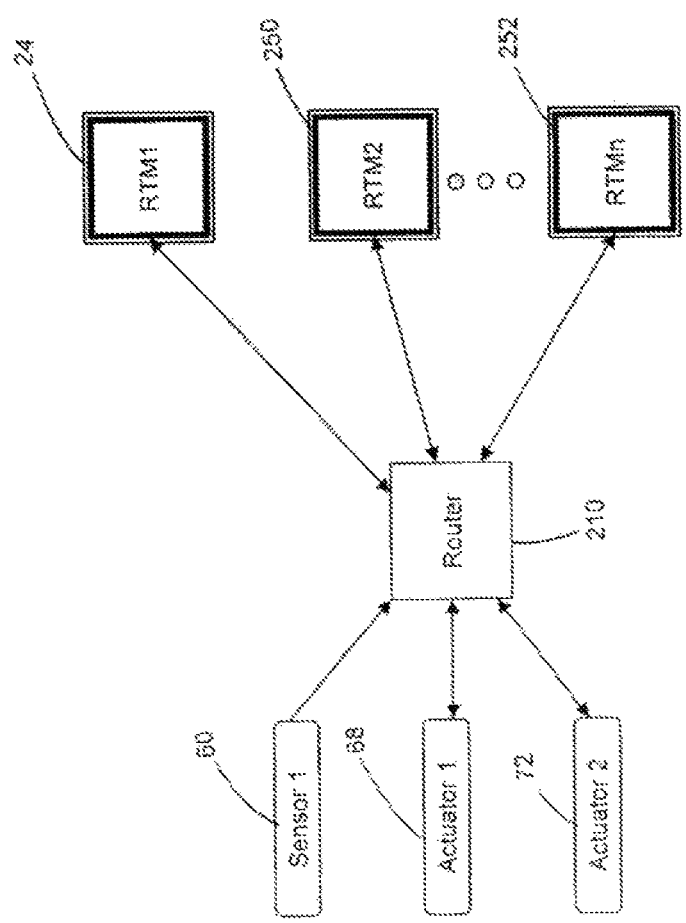
FIG. 14 is a system diagram showing a plurality of RTMs connected to a client through a router.

Turning to FIG. 14, another configuration for an RTM 24 is provided whereby multiple RTMs are connected to a router 210. The configuration provides redundancy in the event one RTM malfunctions, fails, or is disconnected from the router 210. As shown, multiple clients are attached to RTM 24, via the router 210, including a sensor and two actuators. RTM2 250 and RTMn 252 are also connected to the router 210, which passes information from the sensor and actuators to each of RTM. Thus, each RTM has the same information and operates identically to the other. As a result, each RTM provides identical outputs to the other RTMs. However, as data receiving clients do not need to receive data from each RTM, only one RTM is designated as the master RTM. The master RTM is responsible for transmitting the data to the clients. In the event the master RTM fails, another RTM will begin transmitting the data the clients. For example, if RTM1 24 fails, then RTM2 250 becomes the new master RTM and begins transmitting data. Since the other RTMs are also in simultaneous operation with the master RTM, the transition to the master role of transmitting data can occur with little to no delay. This advantageously facilitates real-time functionality and fail-safe operation.

In another aspect, the simultaneous operation of multiple RTMs, as shown in FIG. 14, facilitate verification of data accuracy. For example, RTM1 24, RTM2 250 and RTMn 252 are operating simultaneously and should produce the same commands and results. The master RTM (e.g. RTM1 24) monitors and compares the commands and results produced by the other RTMs. If RTM2 250 produces different commands or generates a different result from the other RTMs, then a warning is generated. It can be seen that the simultaneous operation of two or more RTMs advantageously allows data to be compared for verification.

The combination of redundancy and data verification may be particularly useful in application where safety is critical. For example, three RTMs may be used to control the delivery of water into a nuclear power generator. There are three sets of temperature and flow sensors monitoring the delivery of water, whereby each set is connected to an RTM. If any one of the three RTMs produces commands or results that differ from the other RTMs, then a warning is generated and the nuclear power generator is shut down. For redundancy, each RTM would control a separate shut down mechanism. Thus, failure of any one RTM would allow the safety functionality of the RTM network to continue operating.

It can thus be seen that the RTM 24 may be used to coordinate a variety of clients for a number of applications in a real-time manner. Some other examples of the RTM's application for a lighting and entertainment environment are provided below.

The RTM 24 may coordinate a motion tracking system in combination with a safety proximity system to command a lighting console to turn on or off lights based on an object's position.

The RTM 24 may also coordinate a motion tracking system to trigger a $3^{rd}$ party media server to deliver media content on a number of screens, wherein the media content is displayed in skew, key stoning, soft edge blending or various focus settings based on an objects motion.

In yet another example, the RTM 24 coordinates an actuator console to place moving scenery at various start and stop positions, thereby assisting scenery designers to build moving scenic cues faster.

In another application, the RTM 24 may be used to determine the technical specifications of certain devices. For examples, a lighting technician may use the visualization engine 26 to determine the range of movement that a robotic light can move, thereby determining the lighting coverage in a physical environment.

In another application, the RTM 24 coordinates an LPS and a robotic camera to follow an object, as well as zoom and focus appropriately depending on a film director's commands.

The RTM 24 may also be applied to coordinate a motion tracking system and an audio system to provide spatial audio performance. For example, as a talking person moves from a left side of the stage to the right side of the stage, the audio system will broadcast the talking person's voice more quietly on the left side and more loudly on the right side.

The RTM 24 is also applicable in other physical environments. For example, the RTM 24 may also be used to coordinate the process of parking cars in a multilevel parking garage. A virtual environment 4 is created by identifying a physical reference point or origin in the multilevel parking garage and generating a number of virtual objects that correspond to the physical objects. Typical physical objects in a multilevel parking garage include ramps, support pillars, parking spaces and cars. The locations of these objects are measured relative to the physical reference point. As a car enters the parking garage, the driver is given an RFID tag for positional tracking. An array of sensors tracks the position of each car. It can be appreciated that any method or device for tracking a car's position, for example image recognition, is applicable to the principles herein. After the driver enters the parking lot, the driver begins to search for a parking space. Indicators, either audio or visual devices, guide the driver to an available parking space. For example, electronic signs throughout the parking garage display arrows or words to direct the driver to turn left or right, or advance forward. The indication devices are clients of the RTM 24 and provide appropriate indicators based on the RTM's commands. Through the sensors, the RTM 24 updates the location of the virtual cars and virtual parking spaces in the virtual environment database 22, such that the virtual environment corresponds to the physical environment. The RTM 24 also relies on a number of rules, in combination with the virtual database 22 information, to generate commands to the indication devices, to provide the location of the closest available parking space. The indication device uses this location information to guide the driver to the closest available parking space.

Other applications include home or workplace automation where movements of a person can be unpredictable. Attributes of the physical environment are mapped on to a virtual corresponding environment in a home or workplace setting. Sensors measure the movement and location of person within the environment. Based on the contextual information provided by the virtual environment, the RTM 24 can send commands to clients, such as a lighting device to automatically turn on a light as a person enters a room. Moreover, as a person enters a kitchen area, the RTM 24 can activate a food warming device and coffee-making device to automatically prepare food.

In yet another environment, the RTM 24 can be used to coordinate security devices on a border on a piece of land, for example between two neighboring countries. A virtual environment is created based on the landscape and objects (e.g. trees, fence, light posts, etc.) along the border. Sensors, such as cameras or RADAR, monitor movement of any people or vehicles approaching or crossing the border. In response, the RTM 24 may generate a command signal to activate a recording device to record and transmit the camera data to a security station.

The RTM 24 may also be applied in a construction environment in which a crane is being operated. For example, a virtual environment including virtual objects (e.g. building under construction, crane, cabling, object being lifted, etc.) is created to match or correspond with the physical environment. Sensors, in communication with the RTM 24, measure wind speed, positioning of the crane, winding motor speed, and the position of the object being lifted. The RTM 24 coordinates the actuators of the crane to ensure that the object being lifted does not swing into the building or collide with a person.

Other applications where there is a degree of unpredictability include the movement of livestock in a farm setting and the movement of people in a hospital or prison setting. In such situations, the RTM 24 communicates with sensors to track the position and movements of the livestock or people. Based on the positions or movements, certain devices are activated.

It can be appreciated that from the non-exhaustive list of examples provided herein, the above principles may also apply in various other physical environments. Accordingly, the types of clients and the virtual objects and attributes would vary depending on the physical environment in which the RTM 24 is applied.

Although the above has been described with reference to certain specific embodiments, various modifications thereof will be apparent to those skilled in the art as outlined in the appended claims.

The invention claimed is:

1. A method for coordinating one or more physical objects in a physical environment comprising:
   providing in a computing device a first and a second virtual object respectively corresponding to a first and a second physical object, and respectively mapping one or more attributes about said first and said second physical objects onto said first and said second virtual objects;
   receiving, by said computing device, data pertaining to one or more of said attributes about said first physical object from a first client, said computing device in communication with said first client;
   updating, by said computing device, said one or more attributes about said first virtual object using said data;

sending, by said computing device, said one or more attributes about said first virtual object to a second client, said computing device in communication with said second client, and said second client configured to change said second physical object based on said one or more attributes about said first physical object;

receiving, by said computing device, other data pertaining to one more of said attributes about said second physical object from said second client, said other data reflecting said change of said second physical object; and updating, by said computing device, said one or more attributes about said second virtual object using said other data.

2. The method of claim 1 further comprising said computing device further updating said one or more attributes about said first virtual object using said other data.

3. The method of claim 1 wherein said first physical object is a moving object and said second physical object is a robotic light or a robotic camera.

4. The method of claim 1 further comprising:
said computing device receiving a command to affect at least one of said first and said second physical objects from said second client or a third client;
determining if said command triggers at least one rule;
if so, modifying said command according to said at least one rule;
using said modified command to update said virtual object; and
sending said modified command to at least one of said first, second and third clients to affect said at least one of said first and said second physical objects.

5. The method of claim 4 wherein said command includes position and orientation data.

6. The method of claim 4 further comprising:
providing a virtual environment corresponding to said physical environment; and
wherein said at least one rule comprises determining, in said virtual environment, if said command causes at least one of said first and said second virtual objects to collide with an other virtual object, said other virtual object corresponding to an other physical object in said physical environment.

7. The method of claim 6 wherein, if said at least one rule is triggered, said computing device modifying said command to affect said physical object without causing said virtual object to collide with said other virtual object.

8. The method of claim 1 further comprising determining if said data pertaining to said one or more attributes about said first physical object comprises at least one of position information and orientation information of said physical object and, if so, processing said data in real-time.

9. The method of claim 1 wherein processing at least one of said data and said other data occurs in real-time and comprises:
storing said data in a first buffer storage;
moving, from said first buffer storage, at least one of said data into a second buffer storage;
clearing the memory from said first buffer storage;
exchanging data with a virtual environment, said virtual environment corresponding to said physical environment, to at least one of update and retrieve information of at least one of said first and second virtual objects according to at least one of said data and said command from said second buffer storage; and
storing at least one of said updated data and said modified command in a broadcasting buffer storage.

10. The method of claim 9 further comprising, while data is exchanged with said virtual environment, said first buffer storage simultaneously collects at least one of a new set of data and a new command.

11. A computing system configured for coordinating one or more physical objects in a physical environment, comprising:
a communication device configured to communicate with one or more clients;
a memory for storing one or more attributes about one more virtual objects corresponding to said one or more physical objects; and
a processor configured to perform computer executable instructions at least for:
respectively mapping one or more attributes about a first and a second physical object onto a first and a second virtual object;
receiving data pertaining to one or more of said attributes about said first physical object from a first client;
updating said one or more attributes about said first virtual object using said data;
sending said one more attributes about said first virtual object to a second client, said second client configured to change said second physical object based on said one more attributes about said first physical object;
receiving other data pertaining to one more of said attributes about said second physical object from said second client, said other data reflecting said change of said second physical object; and
updating said one or more attributes about said second virtual object using said other data.

12. The computing system of claim 11 wherein said processor is further configured to update said one or more attributes about said first virtual object using said other data.

13. The computing system of claim 11 wherein said first physical object is a moving object and said second physical object is a robotic light or a robotic camera.

14. The computing system of claim 11 wherein said processor is further configured to:
receive a command to affect at least one of said first and said second physical objects from said second client or a third client;
determine if said command triggers at least one rule;
if so, modify said command according to said at least one rule;
use said modified command to update said virtual object; and
send said modified command to at least one of said first, second and third clients to affect said at least one of said first and said second physical objects.

15. The computing system of claim 14 wherein said command includes position and orientation data.

16. The computing system of claim 14 wherein said processor is further configured to:
provide a virtual environment corresponding to said physical environment; and
wherein said at least one rule comprises determining, in said virtual environment, if said command causes at least one of said first and said second virtual objects to collide with an other virtual object, said other virtual object corresponding to an other physical object in said physical environment.

17. The computing system of claim 16 wherein, if said at least one rule is triggered, said computing device modifying said command to affect said physical object without causing said virtual object to collide with said other virtual object.

18. The computing system of claim 11 wherein said processor is further configured to determine if said data pertaining to said one or more attributes about said first physical object comprises at least one of position information and orientation information and, if so, processing said data in real-time.

19. The computing system of claim 1 wherein processing at least one of said data and said other data occurs in real-time, and said computing system further comprises a first buffer storage, a second buffer storage and a broadcasting buffer storage, and said processor is further configured to:
   store said data in said first buffer storage;
   move, from said first buffer storage, at least one of said data into said second buffer storage;
   clear the memory from said first buffer storage;
   exchange data with a virtual environment, said virtual environment corresponding to said physical environment, to at least one of update and retrieve information of at least one of said first and second virtual objects according to at least one of said data and said command from said second buffer storage; and
   store at least one of said updated data and said modified command in said broadcasting buffer storage.

20. The computing system of claim 19 wherein, while data is exchanged with said virtual environment, said first buffer storage simultaneously collects at least one of a new set of data and a new command.

\* \* \* \* \*